(12) United States Patent
Okada et al.

(10) Patent No.: US 9,748,045 B2
(45) Date of Patent: Aug. 29, 2017

(54) NONAQUEOUS LITHIUM STORAGE ELEMENT

(71) Applicant: Asahi Kasei Kabushiki Kaisha, Osaka (JP)

(72) Inventors: Nobuhiro Okada, Tokyo (JP); Takeshi Kamijo, Tokyo (JP); Shiro Mori, Kyoto (JP); Takashi Yamasaki, Kyoto (JP); Akiko Kaneko, Kyoto (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/649,809

(22) PCT Filed: Dec. 5, 2013

(86) PCT No.: PCT/JP2013/082723
§ 371 (c)(1),
(2) Date: Jun. 4, 2015

(87) PCT Pub. No.: WO2014/088074
PCT Pub. Date: Jun. 12, 2014

(65) Prior Publication Data
US 2015/0311002 A1    Oct. 29, 2015

(30) Foreign Application Priority Data

Dec. 6, 2012   (JP) .................................. 2012-267592
Jun. 28, 2013  (JP) .................................. 2013-136717

(51) Int. Cl.
*H01M 4/583*     (2010.01)
*H01G 11/06*     (2013.01)
(Continued)

(52) U.S. Cl.
CPC ............. *H01G 11/06* (2013.01); *H01G 11/24* (2013.01); *H01G 11/28* (2013.01); *H01G 11/34* (2013.01);
(Continued)

(58) Field of Classification Search
CPC ................................ H01M 4/583; H01G 4/96
See application file for complete search history.

(56) References Cited

U.S. PATENT DOCUMENTS

2004/0023118 A1    2/2004  Kinoshita et al.
2010/0276631 A1*  11/2010  Mabuchi ............... H01M 4/133
                                                             252/182.1

FOREIGN PATENT DOCUMENTS

JP    08-107048 A    4/1996
JP    2001-229926 A  8/2001
(Continued)

OTHER PUBLICATIONS

International Preliminary Report on Patentability and Written Opinion issued in corresponding International Patent Application No. PCT/JP2013/082723 dated Jun. 18, 2015.
(Continued)

*Primary Examiner* — Olatunji Godo
(74) *Attorney, Agent, or Firm* — Morgan, Lewis & Bockius LLP

(57) ABSTRACT

Provided is a nonaqueous lithium storage element which is obtained by housing an electrode body and a nonaqueous electrolyte solution containing a lithium salt in an outer case, said electrode body being composed of a negative electrode that is composed of a negative electrode collector and a negative electrode active material layer laminated on one or both surfaces of the negative electrode collector, a positive electrode that is composed of a positive electrode collector and a positive electrode active material layer laminated on (Continued)

one or both surfaces of the positive electrode collector, and a separator.

5 Claims, 3 Drawing Sheets

(51) Int. Cl.
    *H01G 11/24*     (2013.01)
    *H01M 4/587*     (2010.01)
    *H01M 4/02*     (2006.01)
    *H01M 10/0525*     (2010.01)
    *H01G 11/34*     (2013.01)
    *H01G 11/44*     (2013.01)
    *H01G 11/38*     (2013.01)
    *H01G 11/52*     (2013.01)
    *H01G 11/28*     (2013.01)
    *H01G 11/40*     (2013.01)
    *H01G 11/42*     (2013.01)
    *H01G 11/56*     (2013.01)
    *H01G 11/78*     (2013.01)
    *H01G 11/86*     (2013.01)
    *H01M 4/04*     (2006.01)
    *H01M 10/0566*     (2010.01)
    *H01M 10/058*     (2010.01)

(52) U.S. Cl.
    CPC ............ *H01G 11/38* (2013.01); *H01G 11/40* (2013.01); *H01G 11/42* (2013.01); *H01G 11/44* (2013.01); *H01G 11/52* (2013.01); *H01G 11/56* (2013.01); *H01G 11/78* (2013.01); *H01G 11/86* (2013.01); *H01M 4/02* (2013.01); *H01M 4/0404* (2013.01); *H01M 4/587* (2013.01); *H01M 10/0525* (2013.01); *H01M 10/058* (2013.01); *H01M 10/0566* (2013.01); *H01M 2004/021* (2013.01); *H01M 2004/027* (2013.01); *Y02E 60/13* (2013.01); *Y02P 70/54* (2015.11); *Y02T 10/7011* (2013.01); *Y02T 10/7022* (2013.01)

(56) References Cited

FOREIGN PATENT DOCUMENTS

| | | |
|---|---|---|
| JP | 2003-217674 A | 7/2003 |
| JP | 2003-346801 A | 12/2003 |
| JP | 2003-346802 A | 12/2003 |
| JP | 2004-221523 A | 8/2004 |
| JP | 2010-080419 A | 4/2010 |
| JP | 2010-267875 A | 11/2010 |
| JP | 2010-267878 A | 11/2010 |
| WO | 02/41420 A1 | 5/2002 |

OTHER PUBLICATIONS

International Search Report issued in corresponding International Patent Application No. PCT/JP2013/082723 dated Feb. 18, 2014.
Supplementary European Search Report issued in corresponding European Patent Application No. 13860736.1 dated Oct. 20, 2015.

* cited by examiner (a)

(b)

NONAQUEOUS LITHIUM STORAGE ELEMENT

TECHNICAL FIELD

The present invention relates to a nonaqueous lithium-type storage element.

BACKGROUND ART

Recently, from the viewpoint of effective utilization of energy aimed at global environmental conservation and resource saving, a power smoothing system for wind power generation or a nighttime power storage system, a home-use distributed electrical storage system based on photovoltaic power generation technology, an electrical storage system for electric vehicles, etc., have attracted attention.

In these electrical storage systems, the first requirement is that the energy density of a battery to be used is high. As a strong candidate of a battery having high energy density capable of satisfying the requirements, lithium ion batteries has been actively developed.

The second requirement is high output characteristics. For example, in a combination of a highly efficient engine and an electrical storage system (for example, a hybrid electric vehicle), or in a combination of a fuel cell and an electrical storage system (for example, a fuel-cell electric vehicle), high output discharge characteristics are required from the electrical storage system, in order to achieve acceleration.

At the present time, as a high-output storage element, electric double layer capacitors using an activated carbon as electrodes, have been developed, and exhibit an output characteristics of about 0.5 to 1 KW/L. These electric double layer capacitors have high durability (cycle characteristics and high temperature storage characteristics), and have been considered to be the optimum device in fields where the above-described high output is required, however, the energy density thereof is only about 1 to 5 Wh/L, and further improvement of the energy density is required.

On the other hand, a nickel-hydrogen battery that is currently adopted for use in hybrid electric vehicles has the same high output as that of the electric double layer capacitors, and has an energy density of about 160 Wh/L. However, research is being actively carried out to further enhance energy density and output thereof, as well as to further improve stability at high temperatures and enhance durability.

In addition, as with lithium ion batteries, research continues toward realizing higher output. For example, a lithium ion battery has been developed that is capable of providing a high output of over 3 kW/L, at a depth of discharge (a value indicating a state of discharge of the storage element in terms of percentage) of 50%. However, a lithium ion battery has been actually designed to suppress high energy density equal to or less than 100 Wh/L, even though a lithium ion battery is identically characterized by a high density. In addition, durability thereof (cycle characteristics and high temperature storage characteristics) is inferior to that of the electric double layer capacitors. Therefore, in order to have practical durability, the lithium ion battery is usable only in a depth of discharge that is a narrower range than 0 to 100%. Therefore, usable capacitance in practice is reduced, and further research is being carried out to enhance the durability.

Although practical application of the storage element having all of high energy density, high output density, and durability, as described above, has been strongly required, the above-described existing storage elements have advantage and disadvantage. Accordingly, a new storage element satisfying these technological requirements has been required, and as a strong candidate thereof, the storage element called a lithium ion capacitor has attracted an attention and has been actively developed.

Energy of a capacitor is expressed by $\tfrac{1}{2} \cdot C \cdot V^2$ (wherein, C is static capacitance, and V is voltage). A lithium ion capacitor is one type of a storage element (nonaqueous lithium-type storage elements) that uses a nonaqueous electrolytic solution containing a lithium salt, and carries out charge/discharge by a non-faradaic reaction based on adsorption/desorption of a negative ion similarly as in the electric double layer capacitor, in a positive electrode at about 3 V or higher, and by a faradaic reaction based on intercalation/deintercalation of lithium ions similarly as in the lithium ion battery, in a negative electrode.

As described above, in the electric double layer capacitors which carries out charge/discharge by the non-faradaic reaction in both the positive electrode and the negative electrode, output characteristics are superior (it means that charging and discharging of high current are possible in a short period of time), but energy density is low. On the other hand, in a secondary battery which carries out charge/discharge by the faradaic reaction in both the positive electrode and the negative electrode, energy density is superior but output characteristics are inferior. The lithium ion capacitor is the storage element aimed at compatibility of both superior input/output characteristics and high energy density, by carrying out charge/discharge based on the non-faradaic reaction in the positive electrode, and based on the faradaic reaction in the negative electrode.

As examples of the lithium ion capacitor, there has been proposed a storage element using an activated carbon as a positive electrode active material and a carbonaceous material as a negative electrode active material, wherein the carbonaceous material is a carbon material capable of accommodating/releasing lithium in an ionized state, to which lithium is accommodated in advance by a chemical method or an electrochemical method, and includes natural graphite, artificial graphite, graphitized mesophase carbon microsphere, graphitized mesophase carbon fiber, graphite whisker, graphitized carbon fiber, a pyrolysate of a furfuryl alcohol resin or a novolac resin, or a pyrolysate of a polycyclic hydrocarbon condensed polymeric compound, such as pitch or cokes, etc. (see PATENT LITERATURE 1).

In addition, as shown below, there has been proposed an electrode and/or a storage element using an activated carbon as a positive electrode active material, and a carbonaceous material as a negative electrode active material, wherein the carbonaceous material is a composite porous material, in which a carbonaceous material is deposited on a surface of an activated carbon, and to which lithium is accommodated in advance (hereafter it may also be referred to as "pre-doping" to distinguish from the accommodation "dope" and release "undope" of lithium ions generated at a negative electrode in charge/discharge to the negative electrode) (see PATENT LITERATURE 2 to 6). The lithium ion capacitor using the composite porous material for a negative electrode is characterized by having lower internal resistance, because it has larger surface area as compared with a lithium ion capacitor using other materials, such as graphite, for the negative electrode.

PATENT LITERATURE 2 describes an electrode having a discharge capacitance (referred to as B) of 605 mAh/g, and an initial efficiency (determined by B/A) of 56%, by electrochemically pre-doping lithium (the pre-doped amount is referred to as A) to a negative electrode active material which has a weight ratio of a carbonaceous material to an activated carbon (hereafter it may also be referred to as "the weight ratio") of 50%.

PATENT LITERATURE 3 describes an electrode having, by pre-doping lithium electrochemically to a negative electrode active material where the weight ratio is 50% or 29%, a discharging capacitance (B) of 605 mAh/g, and an initial efficiency (B/A) of 56%; and an electrode having a discharging capacitance (B) of 560 mAh/g, and an initial efficiency (B/A) of 51%. PATENT LITERATURE 3 also describes a lithium ion capacitor, having a negative electrode to which lithium is pre-doped electrochemically, in an amount of 1000 mAh/g or 500 mAh/g, to a negative electrode active material where the weight ratio is 50%.

PATENT LITERATURE 4 describes an electrode having an undoping capacitance (B) of 337 to 449 mAh/g, and an initial efficiency (B/A) of 35.1% to 66.7%, by electrochemically pre-doping lithium to a negative electrode active material where the weight ratio is 25% to 100%. PATENT LITERATURE 4 also describes a lithium ion capacitor having a negative electrode to which lithium is pre-doped electrochemically in an amount of 400 mAh/g to 700 mAh/g, to a negative electrode active material where the weight ratio is 31.6% to 69.7%.

PATENT LITERATURE 5 describes an electrode having an undoping capacitance (B) of 312 to 456 mAh/g, and an initial efficiency (B/A) of 27.1% to 66.7%, by electrochemically pre-doping lithium to a negative electrode active material where the weight ratio is 16.3% to 77.3%. PATENT LITERATURE 5 also describes a lithium ion capacitor having a negative electrode in which lithium is pre-doped electrochemically in an amount of 500 mAh/g to a negative electrode active material where the weight ratio is 46.4%.

PATENT LITERATURE 6 describes a lithium ion capacitor having a negative electrode in which lithium is pre-doped electrochemically in an amount of 700 mAh/g to 1500 mAh/g to a negative electrode active material where the weight ratio is 62% to 97%. It is clear from the lithium ion capacitor described in PATENT LITERATURE 6 that durability evaluated by a float charging test is enhanced by controlling a pre-doping amount of lithium ions.

CITATION LIST

Patent Literature

PATENT LITERATURE 1: JP H08-107048 A
PATENT LITERATURE 2: JP 2001-229926 A
PATENT LITERATURE 3: WO2002/041420
PATENT LITERATURE 4: JP 2003-346801 A
PATENT LITERATURE 5: JP 2003-346802 A
PATENT LITERATURE 6: JP 2010-267875 A

SUMMARY OF INVENTION

Technical Problem

In the above-described study of the negative electrode active material which is formed by pre-doping lithium ions to the composite porous material where a carbonaceous material is deposited on the surface of the activated carbon, as described in PATENT LITERATUREs 2 to 5, the electrode is evaluated based on the broad range of the weight ratio of the carbonaceous material to the activated carbon, and the initial efficiency relative to the pre-doping amount of lithium ion (B/A: a weight ratio of the amount of lithium ion undopable from a negative electrode, to the total amount of the lithium ion pre-doped to the negative electrode); and production conditions of the lithium ion capacitor have been determined based on standards of judgment with regard to a high value of the initial efficiency. The high value thereof is preferable, because, when a negative electrode material having the value is used for the negative electrode of the lithium ion capacitor, the negative electrode can be used at a low negative-electrode potential in charge/discharge process of the capacitor. As a result, it has been considered that a negative electrode of the lithium ion capacitor optionally has a small range of pre-doping amount of lithium ion of 400 to 700 mAh/g, in despite of a broad range of the weight ratio of the carbonaceous material to the activated carbon of 25 to 100% (there is only one example of 1000 mAh/g in PATENT LITERATURE 3).

On the contrary, PATENT LITERATURE 6 shows an increase in pre-doping amount of lithium ion to 700 to 1500 mAh/g improves durability of the negative electrode of the lithium ion capacitor in the case where a weight ratio of a carbonaceous material to the activated carbon is as high as 62 to 97%.

Although the lithium ion capacitor described in PATENT LITERATURE 6 is excellent in output characteristics and durability, it is necessary to further enhance the output characteristics and durability, as well as to attain higher energy density by making the negative electrode active material layer thinner and making the volume of the capacitor smaller. However, with respect to the invention described in PATENT LITERATURE 6 it is clear that when the membrane thickness of the negative electrode active material layer is lower than 46 μm described in the Example, although the energy density is enhanced, the output characteristics and durability are lowered as compared with the case where the membrane thickness is higher.

In view of the above situation, a problem to be solved by the present invention is to provide a nonaqueous lithium-type storage element having high energy density, high output characteristics, and high durability.

Solution to Problem

The present inventors have intensively studied to solve the problems; have discovered that, when initial-time lithium charge/discharge characteristics of a negative electrode active material satisfy following 1) and 2):
  1) charging amount is 1100 mAh/g to 2000 mAh/g, and
  2) discharging amount is 100 mAh/g or higher at a negative electrode potential of 0 to 0.5 V, a nonaqueous lithium-type storage element which satisfies both of high energy density and durability while maintaining high output characteristics can be obtained; and thereby have completed the present invention.

In particular, the present invention is as follows:
[1] A nonaqueous lithium-type storage element comprising:
  a casing;
  an electrode body; and
  a nonaqueous electrolytic solution containing a lithium salt;
  wherein the electrode body and nonaqueous electrolytic solution are stored within the casing,
  the electrode body comprises:
    a negative electrode comprising a negative electrode collector, and a negative electrode active material layer laminated on one surface or both surfaces of the negative electrode collector;

a positive electrode comprising a positive electrode collector, and a positive electrode active material layer laminated on one surface or both surfaces of the positive electrode collector; and a separator;

the negative electrode active material layer contains a negative electrode active material, and initial-time lithium charge/discharge characteristics of the negative electrode active material satisfy following 1) and 2):

1) a charging amount is 1100 mAh/g to 2000 mAh/g; and
2) a discharging amount is 100 mAh/g or higher at a negative electrode potential of 0 to 0.5 V.

[2] A nonaqueous lithium-type storage element comprising:

a casing;

an electrode body; and a nonaqueous electrolytic solution containing a lithium salt;

wherein the electrode body and nonaqueous electrolytic solution are stored within the casing, the electrode body comprises:

a negative electrode comprising a negative electrode collector, and a negative electrode active material layer laminated on one surface or both surfaces of the negative electrode collector;

a positive electrode comprising a positive electrode collector, and a positive electrode active material layer laminated on one surface or both surfaces of the positive electrode collector; and a separator;

the negative electrode active material layer contains a negative electrode active material, the negative electrode active material contains a composite porous material in which a pitch coal is deposited on a surface of an activated carbon, and the negative electrode active material satisfies following i) and ii):

i) a weight ratio of the pitch coal relative to the activated carbon is 10% to 60%, and a softening point of a pitch as a raw material of the pitch coal is 100° C. or lower; and ii) the negative electrode active material has a BET specific surface area of 350 m$^2$/g to 1500 m$^2$/g, and is doped with lithium ions in an amount of 1100 mAh/g to 2000 mAh/g.

[3] The nonaqueous lithium-type storage element according to [1] or [2], wherein the negative electrode active material contains the composite porous material in which the pitch coal is deposited on the surface of the activated carbon, and the composite porous material satisfies at least one of following I) to III):

I) $0.010 \leq Vm1 \leq 0.300$, and $0.010 \leq Vm2 \leq 0.200$;
II) $0.010 \leq Vm1 \leq 0.200$, and $0.200 \leq Vm2 \leq 0.400$; and
III) $0.010 \leq Vm1 \leq 0.100$, and $0.400 \leq Vm2 \leq 0.650$;

provided that Vm1 (cc/g) is a mesopore volume derived from a fine pore having a size of 20 Å to 500 Å, calculated by a BJH method, and Vm2 (cc/g) is a micropore volume derived from a fine pore having a size of smaller than 20 Å, calculated by a MP method.

[4] A production method of the nonaqueous lithium-type storage element according to any one of [1] to [3], comprising:

thermally reacting the activated carbon with the pitch in an inert atmosphere, to produce the composite porous material in which the pitch coal is deposited on the surface of the activated carbon, wherein the activated carbon satisfies the following:

$0.050 \leq V1 \leq 0.500$;
$0.005 \leq V2 \leq 1.000$; and
$0.2 \leq V1/V2 \leq 20.0$;

provided that V1 (cc/g) is a mesopore volume derived from a fine pore having a size of 20 Å to 500 Å, calculated by the BJH method, and V2 (cc/g) is a micropore volume derived from a fine pore having a size of smaller than 20 Å, calculated by the MP method;

applying a slurry comprising the composite porous material, a binder and a solvent on one surface or both surfaces of the negative electrode collector, and drying the slurry, to form the negative electrode active material layer containing the composite porous material; and pre-doping the negative electrode with lithium ions in an amount of 1100 to 2000 mAh/g based on the unit weight of the composite porous material.

[5] The nonaqueous lithium-type storage element according to any one of [1] to [3], wherein the positive electrode active material layer contains the positive electrode active material;

the positive electrode active material contains an activated carbon having a BET specific surface area of 2600 m$^2$/g to 4500 m$^2$/g, a mesopore volume V1 (cc/g) of $0.8<V1 \leq 2.5$, derived from a fine pore having a size of 20 Å to 500 Å, calculated by the BJH method, a micropore volume V2 (cc/g) of $0.92<V2 \leq 3.0$, derived from a fine pore having a size of smaller than 20 Å, calculated by the MP method, and an average particle size of 1 μm to 30 μm; and the positive electrode active material layer has a volume density of 0.40 g/cm$^3$ to 0.70 g/cm$^3$.

[6] The nonaqueous lithium-type storage element according to [5], wherein, when the separator is maintained at 100° C. for 1 hour in a non-restrained state, the separator has a thermal shrinkage of 3% to 10% in a first direction, and a thermal shrinkage of 2% to 10% in a second direction which is orthogonal to the first direction, a larger electrode area which is any one of an area of the positive electrode active material layer of the positive electrode and a negative electrode area of the negative electrode active material layer of the negative electrode, and an area of the separator have a following relationship:

(separator area)>(electrode area); and $X^1$ and $X^2$ are both 0.5 to 8.0, wherein $X^1$ is calculated by formula (1):

$$X^1 = \{L_1 \text{ or } L_1'/(A/2)\} \times 100$$

wherein, in an arbitrary straight line which is parallel to the first direction of the separator and makes any one of $L_1$ and $L_1'$ the shortest, in a top view, A is a length of a portion where the electrode area in the arbitrary straight line and the separator overlap, and $L_1$ and $L_1'$ are lengths of portions where the electrode area and the separator do not overlap; and wherein $X^2$ is calculated by formula (2):

$$X^2 = \{L_2 \text{ or } L_2'/(B/2)\} \times 100$$

wherein, in an arbitrary straight line which is parallel to the second direction of the separator and makes any one of $L_2$ and $L_2'$ the shortest, in a top view, B is a length of a portion where the electrode area in the arbitrary straight line and the separator overlap, and $L_2$ and $L_2'$ are lengths of portions where the electrode area and the separator do not overlap.

Advantageous Effects of Invention

The nonaqueous lithium-type storage element of the present invention has compatibility of high energy density and durability, while maintaining high output characteristics.

DESCRIPTION OF EMBODIMENTS

Figure 1:
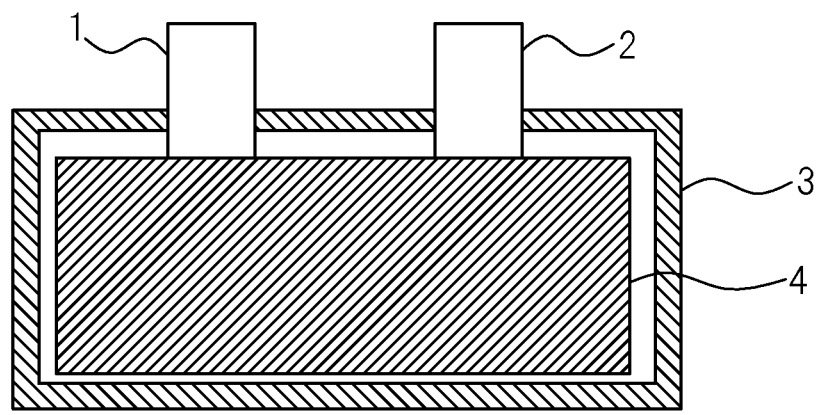
FIG. 1 (a) is a schematic cross-section drawing of a plane direction, showing one aspect of a storage element of the present invention, and FIG. 1 (b) is a schematic cross-section drawing of a thickness direction, showing one aspect of a storage element of the present invention.
Figure 1:
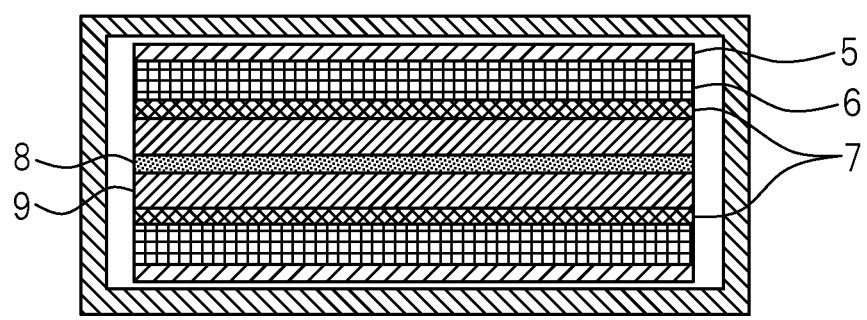

An embodiment of the present invention is explained in detail below.
<1. Negative Electrode>
A negative electrode for the nonaqueous lithium-type storage element of the present invention is formed by laying a negative electrode active material layer on a negative electrode collector.
<1.1 Negative Electrode Active Material>
A negative electrode active material in the present invention is contained in the negative electrode active material layer, and is characterized in that initial-time lithium charge/discharge characteristics satisfy following 1) and 2):

1) an initial-time lithium charging amount is 1100 mAh/g to 2000 mAh/g; and
2) an initial-time lithium discharging amount is 100 mAh/g or higher at a negative electrode potential of 0 to 0.5 V;

provided that, in a three electrode-type cell, where a working electrode is a negative electrode, a counter electrode is lithium, a reference electrode is lithium, and an electrolytic solution is prepared by dissolving $LiPF_6$ at a concentration of 1 mol/L, in a mixed solvent of ethylene carbonate and methyl ethyl carbonate in a volume ratio of 1:4, the initial-time lithium charging amount is defined by a charging amount after constant-current and constant-voltage charging is carried out for 40 hours in total by charging lithium at a constant current, and still more charging lithium by means of switching the constant current to a constant voltage when a negative electrode potential reaches 1 mV, under a condition that a current value is set to be 100 mA/g per the negative electrode active material, and a cell temperature is 45° C.; and the initial-time lithium discharging amount is defined by a discharging amount when discharging lithium till the negative electrode potential reaches to 2.5 V at the constant current under a condition that the current value is reset to be 50 mA/g per the negative electrode active material, and the cell temperature is 45° C., after the above-described charging is carried out.

With respect to 1), at the charging amount of 1100 mAh/g or higher, the amount of the negative electrode active material within the negative electrode can be lowered, and it is possible to make the negative electrode active material layer thin, and the storage element is capable of exerting high energy density; while at the charging amount of 2000 mAh/g or lower, fine pour amount of the negative electrode active material is not excess, and the volume density of the negative electrode active material layer can be increased. Accordingly, the charging amount is preferably 1200 mAh/g to 1700 mAh/g, and more preferably 1300 mAh/g to 1600 mAh/g.

With respect to 2), in the case where the negative electrode potential is between 0 and 0.5 V, at the discharging amount of 100 mAh/g or higher, the element can be operated at a low negative electrode potential in a charge/discharge process thereof, and thus high durability can be exerted. Accordingly, the discharging amount is preferably 120 mAh/g or higher, and more preferably 140 mAh/g or higher, in the case where the negative electrode potential is between 0 and 0.5 V.

It is preferable that the negative electrode active material in the present invention contains a composite porous material in which a pitch coal is deposited on a surface of an activated carbon.

The negative electrode active material containing the composite porous material of the present invention is characterized by satisfying following i) and ii):

i) a weight ratio of the pitch coal to the activated carbon is 10% to 60%, and a softening point of a pitch, which is a raw material of the pitch coal, is 100° C. or lower; and ii) the negative electrode active material has a BET specific surface area of 350 $m^2$/g to 1500 $m^2$/g, and is doped with lithium ions in an amount of 1100 mAh/g to 2000 mAh/g.

Explanation on i) will be given below.

When the weight ratio of the pitch coal to the activated carbon is 10% or higher, micropores of the activated carbon can be suitably filled with the pitch coal, and durability is not impaired due to enhanced charge/discharge efficiency of lithium ions. In addition, when the weight ratio of a carbonaceous material is 60% or lower, specific surface area can be increased by suitably maintaining fine pores of the composite porous material, and a pre-doping amount of lithium ions can be increased, and as a result, high output density and high durability can be maintained, even though a negative electrode is made as a thin membrane. Accordingly, the weight ratio is preferably 15% to 55%, more preferably 18% to 50%, and particularly preferably 20% to 47%.

Still more, when a softening point of the pitch, which is a raw material of the pitch coal, is 100° C. or lower, although not being constrained to a theory, the micropores of the activated carbon can be suitably filled with the pitch coal, and a discharging amount at the negative electrode potential of 0 to 0.5 V and durability can be improved by enhancing charge/discharge efficiency of the initial time lithium charge/discharge characteristics. Accordingly, the softening point of the pitch is preferably 90° C. or lower, and more preferably 50° C. or lower. It is also preferable that the softening point of the pitch is about 35° C. or higher.

Explanation on ii) will be given below.

When the specific surface area of the negative electrode active material, in the BET method, is 350 $m^2$/g or larger, fine pores of the negative electrode active material can be suitably maintained, and a doping amount of lithium can be increased, and as a result, it is possible to make the negative electrode as a thin membrane. On the other hand, when the specific surface area is 1500 $m^2$/g or smaller, the micropores of the activated carbon can be suitably filled, and charge/discharge efficiency of the initial time lithium charge/discharge characteristics is improved, and therefore a discharging amount at the negative electrode potential between 0 and 0.5 V can be increased, and durability can be enhanced. Accordingly, the specific surface area is preferably 350 $m^2$/g to 1100 $m^2$/g, and more preferably 370 $m^2$/g to 600 $m^2$/g.

Doping the negative electrode active material with lithium ions (it may also be referred to as pre-doping) is carried out. The doping amount is 1100 mAh to 2000 mAh per unit weight (g) of the composite porous material. The doping amount is preferably 1200 mAh/g to 1700 mAh/g, and more preferably 1300 mAh/g to 1600 mAh/g. Pre-doping lithium ions decreases the negative electrode potential, increases a cell voltage in combination with a positive electrode, and increases utilization capacitance of the positive electrode, and thus capacitance and energy density can be high.

In the negative electrode for the nonaqueous lithium-type storage element of the present invention, when the pre-doping amount is 1100 mAh/g or more, lithium ions are sufficiently pre-doped even to an irreversible site where lithium ions in the negative electrode material cannot be desorbed from the site once it is inserted into the site, and the amount of the negative electrode active material relative to the desired lithium amount can be decreased, and therefore the negative electrode membrane can be made thin, and high durability, output characteristics and high energy density can be obtained. In addition, the higher pre-doping amount is, the more the negative electrode potential is decreased and the more durability and energy density are improved. However, when it is 2000 mAh/g or lower, a risk of side-reactions, such as deposition of lithium metal is reduced.

The negative electrode active material may be used alone, or two or more types thereof may be used in combination.

The composite porous material can be obtained, for example, by heat treatment of an activated carbon and a pitch while they coexist.

Although the activated carbon is used as a raw material of the above-described composite porous material, a feedstock which can be converted to the activated carbon is not especially limited, as long as the obtained composite porous material has desired characteristics. As the feedstock, a commercial product obtained from various raw materials, such as a petroleum-type, a coal-type, a plant-type and a polymer-type, can be used. It is preferable to use the activated carbon powder having an average particle size of 1 μm to 15 μm. More preferably, the average particle size is 2 μm to 10 μm.

The average particle size in the present invention indicates a particle size at 50 vol % in an accumulated curve (i.e., 50% size as known as Median size), when the accumulated curve is determined based on total volume as 100%, by means of measurement of particle size distribution using a particle size distribution measurement apparatus. The average particle size can be measured, using a commercial laser diffraction-type particle size distribution measurement apparatus.

On the other hand, the pitch to be used as a raw material of the above-described composite porous material is largely classified as a petroleum-type pitch and a coal-type pitch. As the petroleum-type pitch, distillation residue of crude oil, fluidic catalytic cracking residue (e.g., decant oil), bottom oil from a thermal cracker, ethylene tar obtained in naphtha cracking, etc., are exemplified.

The composite porous material is obtained by depositing the pitch coal on the activated carbon by subjecting volatile components or thermally decomposed components of the pitch to a thermal reaction on a surface of the activated carbon. In this case, deposition of the volatile components or thermally decomposed components of the pitch to the inside of a fine pore of the activated carbon proceeds at a temperature of about 200 to 500° C., and the conversion reaction of the deposited components to the pitch coal proceeds at a temperature of 400° C. or higher. A peak temperature in the heat treatment is determined as appropriate, by characteristics of the obtained composite porous material, a thermal reaction pattern, thermal reaction atmosphere, etc. The peak temperature is preferably 400° C. or higher, more preferably 450° C. to 1000° C., and still more preferably about 500 to 800° C. The peak temperature in the heat treatment may be maintained for 30 minutes to 10 hours, preferably for 1 to 7 hours, and more preferably for 2 to 5 hours. In the case where the heat treatment is carried out at the peak temperature of about 500 to 800° C. for 2 to 5 hours, it is considered that the pitch coal depositing on the surface of the activated carbon is converted to a polycyclic aromatic hydrocarbon.

A production method of the above-described composite porous material includes, for example, a method of heat-treating the activated carbon in inert gas atmosphere containing hydrocarbon gas volatilized from the pitch, and depositing the pitch coal in a vapor phase. In addition, a method for mixing the activated carbon and the pitch in advance, and then carrying out heat treatment; or a method for coating the pitch which is dissolved in a solvent, onto the activated carbon, followed by drying the pitch, and then carrying out the heat treatment can be also utilized.

Since a fine pore distribution after the pitch is deposited inside fine pores of the activated carbon is important for the composite porous material in which the pitch coal is deposited to the surface of the activated carbon, the fine pore distribution is specified by a mesopore volume and a micropore volume. Therefore, it is preferable that the composite porous material satisfies at least one of following I) to III):

I) $0.010 \leq Vm1 \leq 0.300$, and $0.010 \leq Vm2 \leq 0.200$;
II) $0.010 \leq Vm1 \leq 0.200$, and $0.200 \leq Vm2 \leq 0.400$; and
III) $0.010 \leq Vm1 \leq 0.100$, and $0.400 \leq Vm2 \leq 0.650$;

provided that Vm1 (cc/g) is the mesopore volume derived from a fine pore having a size of 20 Å to 500 Å, calculated by a BJH method, and Vm2 (cc/g) is the micropore volume derived from a fine pore having a size of smaller than 20 Å, calculated by a MP method.

When the mesopore volume Vm1 is not greater than the upper limit value (Vm1≤0.300), a specific surface area of the composite porous material can be increased, and a pre-doping amount of lithium ions can be increased, as well as the volume density of the negative electrode can be increased, and as a result, the negative electrode can be made as a thin membrane. In addition, when the micropore volume Vm2 is not greater than the upper limit value (Vm2≤0.650), high charge/discharge efficiency based on lithium ions can be maintained. On the other hand, when the mesopore volume Vm1 and the micropore volume Vm2 are not less than the respective lower limit values (0.010≤Vm1, 0.010≤Vm2), high output characteristics can be obtained.

It is preferable that above I) or II) is satisfied among above I) to III). With respect to above I), it is preferable that the mesopore volume Vm1 is 0.050≤Vm1≤0.300.

In the present invention, the micropore volume and the mesopore volume are values determined by the following methods. A sample is dried under vacuum at 500° C. for a whole day and night to carry out measurement of an absorption isotherm and a desorption isotherm, using nitrogen as an adsorbate. Using the desorption isotherm in this case, the micropore volume and the mesopore volume are calculated by the MP method and the BJH method, respectively. The MP method means a method for determining the micropore volume, micropore area and micropore distribution, by using the "t-plot method" (B. C. Lippens, J. H. de Boer, J. Catalysis, 4319 (1965)). The MP method is a method contrived by M. Mikhail, Brunauer, and Bodor (R. S.

Mikhail, S. Brunauer, E. E. Bodor, J. Colloid Interface Sci., 26, 45 (1968)). The BJH method is a calculation method to be used generally in analysis of a mesopore, and was proposed by Barrett, Joyner, Halenda et. al. (E. P. Barrett, L. G. Joyner and P. Halenda, J. Amer. Chem. Soc., 73, 373 (1951)).

In addition to the mesopore volume and the micropore volume after depositing the pitch coal to the surface of the activated carbon as described above, a fine pore distribution of the activated carbon to be used as a raw material is important for the present invention, so as to obtain the composite porous material with the fine pore distribution range specified in the present invention.

It is preferable that the activated carbon satisfies $0.050 \leq V1 \leq 0.500$, $0.005 \leq V2 \leq 1.000$, and $0.2 \leq V1/V2 \leq 20.0$, provided that V1 (cc/g) is the mesopore volume derived from a fine pore having a size of 20 Å to 500 Å, calculated by the BJH method, and V2 (cc/g) is the micropore volume derived from a fine pore having a size of smaller than 20 Å, calculated by the MP method.

With respect to the mesopore volume, $0.050 \leq V1 \leq 0.350$ is more preferable, and $0.100 \leq V1 \leq 0.300$ is still more preferable. With respect to the micropore volume, $0.005 \leq V2 \leq 0.850$ is more preferable, and $0.100 \leq V2 \leq 0.800$ is still more preferable. With respect to a ratio of the mesopore volume/the micropore volume, $0.22 \leq V1/V2 \leq 10.0$ is more preferable, and $0.25 \leq V1/V2 \leq 10.0$ is still more preferable. In the case where they are over the upper limit, i.e., in the case where the mesopore volume V1 is higher than 0.5, and the micropore volume V2 is higher than 1.0, it is necessary to deposit a more amount of the pitch coal in order to obtain a fine pore structure of the composite pore material of the present invention, and therefore it is difficult to control the fine pore structure.

In addition, the production step of the above-described composite porous material are different from general surface coating, and is characterized by having less occurrence of coagulation even after depositing pitch coal to the surface of the activated carbon, and by having little change in average particle size before and after the deposition. From such characteristics of the production step of the above-described composite porous material, and the fact that the micropore volume and the mesopore volume decrease after deposition, as described in the following Examples, it is estimated in the present invention that a large portion of volatilized components or thermally decomposed components of the pitch has been deposited inside the fine pores of the activated carbon, and a conversion reaction of the deposited component to the pitch coal has been promoted.

An average particle size of the composite porous material in the present invention, as described above, is almost the same as that of the activated carbon before deposition, and is preferably 1 μm to 10 μm. The lower limit is more preferably 2 μm or larger, and still more preferably 2.5 μm or larger. The upper limit is more preferably 6 μm or smaller, and still more preferably 4 μm or smaller. When the average particle size is 2 μm to 10 μm, sufficient durability can be maintained. A measurement method of the average particle size of the composite porous material, referred to here, is similar to the method for measuring the average particle size of the activated carbon as the raw material.

An average fine pore size of the composite porous material is preferably 28 Å or larger, and more preferably 30 Å or larger, in view of obtaining high output characteristics. On the other hand, it is preferably 65 Å or smaller, and more preferably 60 Å or smaller, in view of obtaining high energy density. In the present description, the average fine pore size means a value obtained by dividing a total fine pore volume per weight, which is obtained by measuring each equilibrium adsorption amount of nitrogen gas under each relative pressure at a liquid-nitrogen temperature, by a BET specific surface area.

Atom number ratio of hydrogen atom/carbon atom (hereafter it may also be referred to as H/C), in the composite porous material, is preferably 0.05 to 0.35, and more preferably 0.05 to 0.15. In the case where H/C is over the upper limit value, capacitance (energy density) and charge/discharge efficiency decrease, because the polycyclic aromatic conjugated structure of the carbonaceous material depositing on the surface of the activated carbon is not sufficiently developed. On the other hand, in the case where H/C is below the lower limit value, sufficient energy density may not be obtained, because the carbonization proceeds excessively. In addition, H/C is measured by an element analysis apparatus.

In addition, the composite porous material has an amorphous structure derived from the activated carbon as a raw material, as well as a crystal structure derived from mainly a carbonaceous material deposited. According to a wide-angle X-ray diffraction method, the composite porous material preferably has a spacing $d_{002}$ of the (002) plane of 3.60 Å to 4.00 Å, and crystallite size Lc in a c-axis direction, which is obtained from the half peak width of the peak of the plane, of 8.0 Å to 20.0 Å, and more preferably has $d_{002}$ of 3.60 Å to 3.75 Å, and Lc of 11.0 Å to 16.0 Å.

<1.2. Other Components of Negative Electrode Active Material Layer>

In addition to the above-described negative electrode active material, a conductive filler and a binder can be added to the negative electrode active material layer, as needed. The conductive filler type is not especially limited, and is exemplified by acetylene black, Ketjen black, and vapor phase epitaxy carbon fiber. Additional amount of the conductive filler is preferably, for example, 0 to 30% by mass relative to the negative electrode active material. In addition, the binder is not especially limited, and as the binder, PVDF (polyvinylidene fluoride), PTFE (polytetrafluoroethylene), a styrene-butadiene copolymer, etc., can be used. Additional amount of the binder is preferably, for example, within a range of 3 to 20% by mass relative to the negative electrode active material.

<1.3. Molding of Negative Electrode>

The negative electrode for the nonaqueous lithium-type storage element can be produced by a known electrode formation method for a lithium ion battery, an electric double layer capacitor, etc., and can be obtained, for example, by dispersing the positive electrode active material, the conductive filler, and the binder in a solvent to obtain a slurry-like dispersion; applying the dispersion onto the collector to form the active material layer on the collector, followed by drying the layer; and pressing the layer and collector, as needed. It is also possible to adhere the active material onto the collector with a conductive adhesive, etc., after the active material is dry-mixed with the filler and binder without using a solvent, and is then molded by pressing.

In the negative electrode for the nonaqueous lithium-type storage element, the negative electrode active material layer may be formed on only one surface of the collector, or on both surfaces of the collector. Thickness of the negative electrode active material layer is 15 μm to 45 μm, preferably 20 μm to 40 μm, per one surface. When the thickness is 15 μm or more, sufficient charge/discharge capacitance can be exerted. On the other hand, when the thickness is 45 μm or less, energy density can be increased by contracting a cell volume.

In addition, when there are holes in the collector, thickness of the negative electrode active material layer means average value of the thicknesses of the layer per one surface of a portion of a collector not having holes. In this case, the holes include, for example, a through-hole portion of a punching metal, an open pore portion of an expanded metal, etc.

In addition, the volume density of the negative electrode active material layer is preferably 0.60 g/cm$^3$ to 1.2 g/cm$^3$, and still more preferably 0.70 g/cm$^3$ to 1.0 g/cm$^3$. When the volume density is 0.60 g/cm$^3$ or higher, sufficient strength can be maintained, and sufficient conductivity between the active materials can be exerted. In addition, the volume density of 1.2 g/cm$^3$ or lower ensures that the active material layer has holes where ions sufficiently diffuse inside the layer.

A negative electrode collector material is not especially limited, as long as it does not cause elution or deterioration, such as reaction, in forming the storage element, and includes, for example, copper, iron, stainless steel, etc. In the negative electrode for the nonaqueous lithium-type storage element of the present invention, it is preferable to use copper as the negative electrode collector. With respect to the shape of the negative electrode collector, a metal foil or a structure capable of forming an electrode in a gap of a metal can be used, and the metal foil may be a usual metal foil not having through holes, or may be a metal foil having through holes, such as an expanded metal, punching metal, etching foil. In addition, the thickness of the negative electrode collector is not especially limited, as long as a shape or strength of the negative electrode can be maintained appropriately, and for example, the thickness is preferably 1 to 100 μm.

<1.4. Pre-Doping Lithium Ions to Negative Electrode Active Material>

As a method for pre-doping lithium ions to a negative electrode for the nonaqueous lithium-type storage element, a known method can be used. For example, the known method includes a method for electrochemically pre-doping lithium ions to the negative electrode active material, after molding the material as an electrode, by using the negative electrode as a working electrode, and metal lithium as a counter electrode, to prepare an electrochemical cell in combination with a nonaqueous electrolytic solution. It is also possible to pre-dope lithium ions to the negative electrode, by crimping a metal lithium foil to the negative electrode, and immersing the foil and electrode in the nonaqueous electrolytic solution.

<1.5. Compatibility of Energy Density, Output Characteristics and Durability>

In view of providing the negative electrode which is excellent in all of energy density, output characteristics and durability, it is preferable that the negative electrode active material where the pitch coal is deposited on the surface of the activated carbon contains the composite porous material, and the negative electrode active material satisfies both of following i) and ii):

i) the weight ratio of the pitch coal to the activated carbon is 10% to 60%, and softening point of the pitch, which is a raw material of the pitch coal, is 100° C. or lower; and ii) the negative electrode active material has a BET specific surface area of 350 m$^2$/g to 1500 m$^2$/g, and is doped with lithium ions in an amount of 1100 mAh/g to 2000 mAh/g.

In more detail, to enhance energy density [i.e., capacitance of the storage element (mAh)/volume of the negative electrode (cm$^3$)], it is preferable to adjust thickness of the negative electrode active material layer within the range of 15 μm to 45 μm, and to adjust pitch coal/activated carbon (weight ratio) and softening point of the pitch to the extent that durability of the negative electrode is not impaired, and a pre-doping amount of lithium ions can be increased.

<2. Positive Electrode>

The positive electrode for the nonaqueous lithium-type storage element in the present invention is formed by laying a positive electrode active material layer on a positive electrode collector.

(2.1. Positive Electrode Active Material)

The positive electrode active material layer contains a positive electrode active material and a binder, as well as conductive fillers, as needed. As the positive electrode active material, following activated carbon "1" or "2" is preferably used.

(Activated Carbon "1")

A type of the activated carbon "1" and a raw material thereof are not especially limited, however, it is preferable that a fine pore of the activated carbon is optimally controlled, so as to satisfy both high capacitance (i.e., high energy density) and high output characteristics (i.e., high output density). Specifically, the activated carbon preferably satisfies $0.3 < V1 \leq 0.8$ and $0.5 \leq V2 \leq 1.0$, provided that V1 (cc/g) is the mesopore volume derived from a fine pore having a size of 20 Å to 500 Å, calculated by the BJH method, and V2 (cc/g) is the micropore volume derived from a fine pore having a size of smaller than 20 Å, calculated by the MP method. The activated carbon also preferably has a specific surface area measured by the BET method of 1500 m$^2$/g to 3000 m$^2$/g.

The mesopore volume V1 is preferably a value higher than 0.3 cc/g, in view of increasing output characteristics when a positive electrode material is incorporated into the storage element, and is preferably 0.8 cc/g or lower, in view of suppressing decrease in capacitance of the storage element. In addition, V1 is more preferably 0.35 cc/g to 0.7 cc/g, and still more preferably 0.4 cc/g to 0.6 cc/g.

On the other hand, the micropore volume V2 is preferably 0.5 cc/g or higher to make the specific surface area of the activated carbon "1" larger, as well as to increase capacitance, and is preferably 1.0 cc/g or lower, in the view point of suppressing volume of the activated carbon "1", increasing density as an electrode, and increasing capacitance per unit volume. In addition, V2 is more preferably 0.6 cc/g to 1.0 cc/g, and still more preferably 0.8 cc/g to 1.0 cc/g.

In addition, a ratio of the mesopore volume V1 to the micropore volume V2 (V1/V2) is preferably within a range of $0.3 \leq V1/V2 \leq 0.9$. It is preferable that V1/V2 is 0.3 or higher in view of increasing the ratio of the mesopore volume to the micropore volume, to the extent that decrease in output characteristic can be suppressed, while acquiring high capacitance; and V1/V2 is 0.9 or lower, in view of increasing the ratio of the micropore volume to the mesopore volume, to the extent that decrease in capacitance can be suppressed, while acquiring high output characteristics. In addition, more preferable range of V1/V2 is $0.4 \leq V1/V2 \leq 0.7$, and still more preferable range of V1/V2 is $0.55 \leq V1/V2 \leq 0.7$.

Here, the micropore volume and the mesopore volume of the activated carbon "1" are values determined by the similar method as in the composite porous material.

Average fine pore size of the activated carbon "1" is preferably 17 Å or larger, more preferably 18 Å or larger, and most preferably 20 Å or larger, in view of maximizing output. In addition, it is preferably 25 Å or smaller, in view of maximizing capacitance. The average fine pore size described in the present description indicates a value obtained by dividing a total fine pore volume per weight, which is obtained by measuring each equilibrium adsorption amount of nitrogen gas under each relative pressure at liquid nitrogen temperature, by a BET specific surface area.

The BET specific surface area of the activated carbon "1" is preferably 1500 m$^2$/g to 3000 m$^2$/g, and more preferably 1500 m$^2$/g to 2500 m$^2$/g. In the case where the BET specific surface area is 1500 m$^2$/g or larger, good energy density is obtained easily, and on the contrary, in the case where the BET specific surface area is 3000 m$^2$/g or smaller, performance per electrode volume tends to be enhanced, because it is not necessity to charge a large quantity of a binder to maintain strength of the electrode.

The activated carbon "1" having the characteristics as described above can be obtained by using raw materials and a processing method, both of which are exemplified below.

In the embodiments of the present invention, carbon sources used as the raw materials of the activated carbon "1" are not especially limited, and include, for example, plant-based raw materials, such as wood, wood flour, palm shell, by-products in producing pulp, bagasse, molasses; fossil-based raw materials, such as peat, lignite, brown coal, bituminous coal, anthracite, components of petroleum distillation residue, petroleum pitch, coke, coal tar; various synthetic resins, such as a phenolic resin, a vinyl chloride resin, a vinyl acetate resin, a melamine resin, a urea resin, a resorcinol resin, a celluloid, an epoxy resin, a polyurethane resin, a polyester resin, a polyamide resin; synthetic rubber, such as polybutylene, polybutadiene, polychloroprene; other synthetic wood, synthetic pulp etc., and carbonized products thereof. Among these raw materials, plant-based raw materials, such as palm shell, wood flour, and carbonized products thereof are preferable, and the carbonized product of the palm shell is particularly preferable.

As a method of carbonization and activation so as to convert the raw materials to the active carbon "1", for example, a known method, such as a fixed-bed method, a moving bed method, a fluidized bed method, a slurry method, a rotary kiln method, can be employed.

The carbonization method of the raw materials includes a method in which calcination is carried out at about 400 to 700° C. (preferably at 450 to 600° C.) for about 30 minutes to 10 hours, by using inert gas, such as nitrogen, carbon dioxide, helium, argon, xenon, neon, carbon monoxide, flue gas, or using mixed gas of the inert gas as a main component with gas other than inert gas.

As an activation method for the carbonized product obtained by the above-described carbonization method, a gas activation method for calcination using activation gas of steam, carbon dioxide, oxygen, etc., is preferably used. Among these, a method using steam or carbon dioxide, as activation gas, is preferable.

In the activation method, it is preferable to activate the carbonized product by raising temperature up to 800 to 100° C. taking 3 to 12 hours (preferably 5 to 11 hours, and still more preferably 6 to 10 hours), while supplying activation gas at a rate of 0.5 to 3.0 kg/hr (preferably 0.7 to 2.0 kg/hr).

Still more, the carbonized product may be subjected to primary activation in advance, before carrying out activation processing of the carbonized product. In this primary activation, usually, a carbon material can be gas-activated by calcining it at a temperature lower than 900° C., using activation gas, such as steam, carbon dioxide, oxygen, etc.

By combining calcination temperature and calcination time in the carbonization method, as well as activation gas supply amount, temperature rising rate, and highest activation temperature in the activation method, as appropriate, the activated carbon "1" having the characteristics, which can be used in the embodiment of the present invention, can be produced.

It is preferable that average particle size of the activated carbon "1" is 1 to 20 μm. The average particle size described in the present description indicates a particle size at 50 vol % in an accumulated curve (i.e., 50% size as known as Median size), when the accumulated curve is determined based on total volume as 100%, by means of measurement of particle size distribution using a particle size distribution measurement apparatus.

When the average particle size is 1 μm or larger, capacitance per electrode volume tends to increase, because of high density of the active material layer. On the other hand, when the average particle size is 20 μm or smaller, conformity to high-speed charge/discharge tends to be easy. Still more, the average particle size is preferably 2 to 15 μm, and still more preferably 3 to 10 μm.

(Activated Carbon "2")

It is preferable that the positive electrode active material contains activated carbon "2" which satisfies $0.8<V1\leq2.5$ and $0.92<V2\leq3.0$, provided that V1 (cc/g) is the mesopore volume derived from a fine pore having a size of 20 Å to 500 Å, calculated by the BJH method, and V2 (cc/g) is the micropore volume derived from a fine pore having a size of smaller than 20 Å, calculated by the MP method.

The mesopore volume V1 is preferably a value higher than 0.8 cc/g, in view of increasing output characteristics when a positive electrode material is incorporated into the storage element, and is preferably 2.5 cc/g or lower, in view of suppressing decrease in capacitance of the storage element. In addition, V1 is more preferably 1.00 cc/g to 2.0 cc/g, and still more preferably 1.2 cc/g to 1.8 cc/g.

On the other hand, the micropore volume V2 is preferably 0.92 cc/g or higher to make a specific surface area of the activated carbon "2" larger, as well as to increase capacitance, and is preferably 3.0 cc/g or lower, in the view point of increasing density as an electrode of the activated carbon "2", and increasing capacitance per unit volume. In addition, V2 is more preferably greater than 1.0 cc/g and equal to or less than 2.5 cc/g, and still more preferably 1.5 cc/g to 2.5 cc/g.

The activated carbon "2" having the above mesopore volume and the micropore volume results in higher BET specific surface area as compared with the activated carbon which has been used for a conventional electric double layer capacitor or a lithium ion capacitor. Typical value of the BET specific surface area is 2600 m$^2$/g to 4500 m$^2$/g, and preferably 3000 m$^2$/g to 4000 m$^2$/g. In the case where the BET specific surface area is 2600 m$^2$/g or larger, good energy density is obtained easily in the case where the BET specific surface area is 4000 m$^2$/g or smaller, performance per electrode volume tends to be enhanced, because it is not necessity to charge a large quantity of a binder so as to maintain strength of the electrode.

The activated carbon "2" having such characteristics as above can be obtained by using raw materials and a processing method, both of which are exemplified below.

A carbonaceous materials to be used as the raw materials of the activated carbon "2" are not especially limited, as long as it is a carbon source usually used as raw materials of an activated carbon, and include, for example, plant-based raw materials, such as wood, wood flour, palm shell; fossil-based raw materials, such as petroleum pitch, coke; various synthetic resins, such as a phenolic resin, a furan resin, a vinyl chloride resin, a vinyl acetate resin, a melamine resin, a urea resin, a resorcinol resin. Among these raw materials, a phenolic resin and a furan resin are particularly preferable because they are suitable for preparing the activated carbon "2" having high specific surface area.

A method of carbonization or heating in activation treatment of these raw materials includes, for example, a well-known method, such as, a fixed-bed method, a moving bed method, a fluidized bed method, a slurry method, a rotary kiln method. As atmosphere in heating, inert gas, such as nitrogen, carbon dioxide, helium, argon, or mixed gas of the inert gas as a main component with gas other than the inert gas can be used. In general, calcination can be carried out at a carbonization temperature of about 400 to 700° C., for about 30 minutes to 10 hours.

[Pulverizing and Classification Step]

It is important for the present invention that the carbonaceous material (carbonized product) is pulverized and classified in advance before activation, because the activation can be carried out efficiently, and decrease in characteristics due to an interface, which newly generates when pulverizing is carried out after the activation, can be prevented.

Explanation will be given below on a method for pulverizing the carbonaceous material in advance.

The pulverizing method may be any of dry-type pulverization and wet-type pulverization. The wet-type pulverization is preferable, in view of pulverizing speed, continuous operability or power consumption amount. In the case of the wet-type pulverization, the following conditions can be employed specifically. Pulverizing is carried out firstly by feeding a material to be pulverized, hard beads, such as a metal, zirconia, ceramics, and a solvent into a hard container of a metal, agate, ceramics, etc. The container which can be sealed is preferable, and it is preferable to replace air inside the container with inert gas, such as nitrogen, argon, during pulverization. With respect to the solvent, water or an organic solvent can be used, however, an organic solvent having a low boiling point is not suitable, due to a risk of ignition. The pulverizing time is adjusted by particle size of the obtained material; however, pulverizing for a long period of time could result in contamination of impurities. Because particle size distribution is widened by pulverization, it is preferable to carry out classification using a sieve. As a result of classification, in the present invention, classification between 1 μm and 30 μm can be carried out. The carbonaceous material, obtained by the pulverizing and classification step, is carbonized by the following method to obtain a carbonized product.

The activation method for the carbonized product after the pulverization and classification includes a gas activation method by calcination using activation gas, such as steam, carbon dioxide, oxygen; and an alkali metal activation method by carrying out heat treatment after mixing with an alkali metal compound. The alkali metal activation method is preferable to prepare an activated carbon having high specific surface area. In the activation method, after mixing the carbonized product and the alkali metal compound, such as KOH, NaOH, so as to attain a weight ratio of 1:1 or higher, the heating is carried out under inert gas atmosphere within a temperature range of 600 to 900° C., for 0.5 to 5 hours, and then the alkali metal compound is removed by washing with an acid and water, followed by drying.

In the present invention, the mass ratio of the carbonized product and the alkali metal compound (=carbonized product: alkali metal compound) is 1:1 or higher. The more the alkali metal compound increases, the more the mesopore volume increases. However, at the mass ratio boundary of about 1:3.5, the pore volume tends to increase abruptly. Therefore, the mass ratio is preferably 1:3 or higher, so that the alkali metal compound is further increased, and is also preferably 1:5.5 or lower. With respect to the mass ratio, the more the alkali metal compound increases, the more the pore volume increases. However, in consideration of the post-treatment, such as washing, the mass ratio is preferably within the above range.

In addition, to increase the micropore volume and not to increase the mesopore volume, a little more amount of the carbonized product than the amount of KOH is mixed with KOH in activation. To increase both of the pore volumes, a more amount of KOH than the amount of the carbonized product is used, with respect to the ratio of the carbonized product to KOH. In addition, to increase mainly the mesopore volume, steam activation is carried out after the activation treatment with alkali.

Average particle size of the activated carbon "2" to be used in the nonaqueous lithium-type storage element of the present invention is 1 μm to 30 μm, preferably 2 μm to 20 μm, and more preferably 2 μm to 7 μm. A mixture of two types of the activated carbons having different average particle size may be used. The average particle size here indicates a particle size at 50 vol % in an accumulated curve (i.e., 50% size as known as Median size), when the accumulated curve is determined based on total volume as 100%, by means of measurement of particle size distribution using a particle size distribution measurement apparatus.

In the case where the positive electrode active material contains a material (for example, an activated carbon not having the above-specified V1 and V2, a composite oxide of lithium and a transition metal, etc.) other than the activated carbon having the above-specified V1 and V2, the content of the activated carbon having the specific V1 and V2 should be higher than 50% by weight, based on the total weight of all of the positive electrode active materials. The content of the activated carbon having the specific V1 and V2 is more preferably 70% by weight or higher, still more preferably 90% by weight or higher, and most preferably 100% by weight, based on the total weight of all of the positive electrode active materials.

<2.2. Other Components of Positive Electrode Active Material Layer, and Molding of Positive Electrode)

The positive electrode may be formed with the positive electrode active material layer on only one surface of the positive electrode collector, or on both surfaces of the collector. Thickness of the positive electrode active material layer is, preferably, for example, 30 μm to 200 μm per one surface.

A positive electrode collector material is not especially limited, as long as it is conductive and does not cause elution into the electrolytic solution or deterioration, such as reaction, in production of the storage element. As a suitable material, aluminum is included. As the shape of the positive electrode collector, a metal foil or such a structure (foam, etc.) that an electrode can be formed at a gap of a metal, can be used. The metal foil may be a usual metal foil not having through holes, or may be a metal foil having through holes, such as an expanded metal, punching metal. In addition, the thickness of the positive electrode collector is not especially limited, as long as the shape and the strength of the electrode can be maintained sufficiently, however, for example, 1 to 100 μm is preferable, in view of strength, conductive resistance and capacitance per volume.

A binder to be used in the positive electrode active material layer is not especially limited, however, PVDF (polyvinylidene fluoride), PTFE (polytetrafluoroethylene), a styrene-butadiene copolymer, etc. can be used. The content of the binder in the positive electrode active material layer is preferably, for example, within a range of 3 to 20% by mass relative to 100 parts by mass of the positive electrode active material. In addition, into the positive electrode active material layer, conductive fillers can be mixed, as needed. A type of the conductive fillers is not especially limited, however, acetylene black, Ketjen black, vapor phase epitaxy carbon fiber are exemplified. The additional amount of the conductive fillers is preferably, for example, 0 to 30% by mass relative to 100 parts by mass of the active material.

The positive electrode can be manufactured by utilizing a known electrode formation method in the lithium ion battery, the electric double layer capacitor, etc., and it can be obtained, for example, by carrying out a coating step for coating a slurry, dispersed with the positive electrode active material, electric conductive fillers and a binder in a solvent, onto the positive electrode collector as the positive electrode active material layer; a drying step for drying the solvent; and a pressurizing step for enhancing the volume density of the positive electrode active material layer by pressurization.

The volume density of the positive electrode active material layer is 0.40 g/cm$^3$ or higher, and preferably within a range of 0.45 g/cm$^3$ to 0.70 g/cm$^3$. When the volume density is 0.40 g/cm$^3$ or higher, electrode capacitance per volume can be increased, and down-sizing of the storage element can be attained. In addition, when the volume density is 0.70 g/cm$^3$ or lower, it is considered that diffusion of the electrolytic solution in a void inside the positive electrode active material layer sufficiently occurs to obtain high charge/discharge characteristics at high current.

Since the positive electrode active material has specific micropore volume and mesopore volume, the volume density of the positive electrode active material layer in one embodiment of the present invention is smaller than a volume density of an active material layer of a usual activated carbon prepared by the same method. In that case, in order to attain the above-described volume density in a state of formation as the positive electrode active material layer, for example, a pressurization method under heating (hereafter, it may also be referred to as "heating press") can be used by using a roll, the surface temperature of which is set between the melting point of the binder and a temperature obtained by subtracting 40° C. from the melting point.

It is also possible to carry out a molding step by mixing the activated carbon and the binder in a dry system without using a solvent, and then pressing and molding the mixture to a plate-shape while heating the mixture between the melting point of the binder and a temperature obtained by subtracting 40° C. from the melting point; and an adhering step by adhering the formed positive electrode active material layer to the positive electrode collector with conductive adhesives. In addition, the melting point can be determined by an endothermic peak position in DSC (differential scanning calorimetry). For example, the temperature of an endothermic peak in temperature rising process is the melting point, which is obtained by setting 10 mg of a sample resin at a measurement cell, using a differential scanning calorimeter, "DSC7", manufactured by Perkin Elmer Corp., and increasing the temperature from 30° C. up to 250° C. at a temperature increasing rate of 10° C./min, under nitrogen gas atmosphere.

The heating press method can be carried out, for example, by the following step. Explanation will be given on equipment to be used the heating press with reference to FIG. 4.

Figure 4:
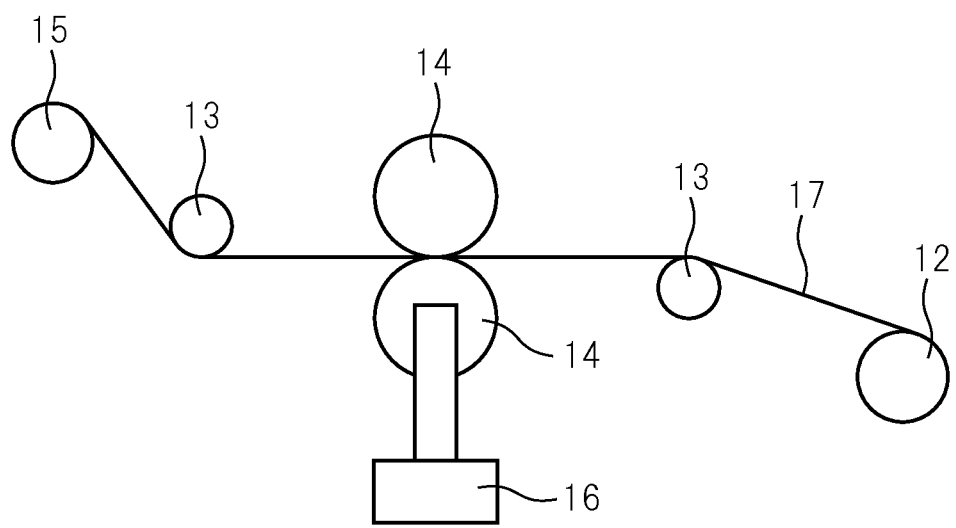
FIG. 4 is a schematic drawing of an apparatus which is used for a heating press.

A feed roll (12), where a positive electrode (17), in which the positive electrode current collector coated with the positive electrode active material layer, is wound-up, is installed in the feed roll position. As shown in FIG. 4, the positive electrode (17) is wound-up to a wind-up roll (15) sequentially via the first guide (13), a heating press roll (14) and the second guide (13).

Surface temperature of the heating press roll (14) is set between the melting point of a binder contained in the positive electrode active material layer and a temperature obtained by subtracting 40° C. from the melting point; preferably between the melting point and a temperature obtained by subtracting 30° C. from the melting point; and more preferably between the melting point and a temperature obtained by subtracting 20° C. from the melting point. For example, in the case where PVDF (polyvinylidene fluoride: melting point is 150° C.) is used as the binder, heating within a range of 110 to 150° C. is preferable, and heating within a range of 120 to 150° C. is more preferable. In the case where a styrene-butadiene copolymer (melting point is 100° C.) is used as the binder, heating within a range of 60 to 100° C. is preferable, and heating within a range of 70 to 100° C. is more preferable.

Pressurization pressure in carrying out heating press and speed in carrying out press are adjusted by the volume density of the obtained positive electrode. The press pressure of the heating press roll is held constant by adjusting the pressure of a hydraulic cylinder (16). The press pressure is preferably 50 kgf/cm to 300 kgf/cm. Press speed is preferably 15 m/min or slower, more preferably 10 m/min or slower, and still more preferably 5 m/min or slower. When the press speed is in the above-described range, sufficient volume density can be obtained.

When the press pressure is too high, because the active material layer is peeled off from the current collector, it is preferable that the press pressure is determined by measuring the cell resistance or the discharge capacitance retention rate.

Distance between press role themselves (distance between rolls) can be selected arbitrarily. In the first time press, press is carried out in an at least narrower distance between rolls than thickness of the electrode to be pressed. However, because effect of increasing volume density by press is small at the distance between rolls near the thickness of the electrode and the active material layer is peeled off from the electrode collector at a too narrow distance, it is preferable to select the distance between rolls by measuring the cell resistance or the discharge capacitance retention rate.

The positive electrode of the present invention is preferably subjected to press two times or more. By pressing one time, the volume density cannot be increased sufficiently, or in order to increase the volume density, it is necessary to press under high pressure or at a too narrow distance between rolls, resulting in peeling or a decrease in performance of the cell resistance or discharge capacitance retention rate. In the case of significant damage of the positive electrode, there may be the case where the cell preparation cannot be carried out.

For example, in the case of carrying out the press two or more times, it is preferable that the distance between rolls in the second time press is the same as or preferably narrower than the distance between rolls in the first time. The required volume density can be obtained, specifically, by carrying out press under condition that the distance between rolls in the second time is 0.4 to 0.6, provided the distance between rolls in the first time is 1, and in the case of carrying out also the third time, the distance between rolls in the third time is 0.2 to 0.4, provided the distance between rolls in the second time is 1. Further press may be carried out as needed. However, from the viewpoint of production efficiency, the number of presses is preferably about two times to three times. In the case of pressing two or more times, the first press may be carried out at room temperature.

The press pressure in the second time may be the same or higher relative to the first press. The higher press pressure is the more preferable from the viewpoint of enhancing density.

The heating press roll (14) is rotated in a direction where the positive electrode (17) is sent from the feed roll (12) to the wind-up roll (15), and controlled to arbitrary speed. The wind-up roll (15) auto-rotates so that tension of the electrode is proper value to wind-up the positive electrode (17). The feed roll (12) does not necessarily have to be auto-rotated, however, the feed roll (12) preferably has a sufficient load so that tension applied to the positive electrode (17) does not loosen.

<3. Electrical Storage Element>

The storage element of the present invention contains an electrode body, where the positive electrode and the negative electrode molded as described above, as well as a separator are laminated or wound and laminated, a nonaqueous electrolytic solution, and a casing, formed by a metal can or a laminated film.

<3.1. Separator>

The separator to be used in the capacitor of the present invention plays roles of insulating the positive electrode body and the negative electrode body, so that they do not directly contact electrically, as well as forming a conducting path of lithium ions between the electrodes, by holding the electrolytic solution in voids inside thereof. In the present embodiment, the separator is made of a polyolefin resin including polyethylene.

In the present embodiment of the present invention, when the separator is maintained at 100° C. for 1 hour in a unconstrained state, thermal shrinkage of the separator is 3% to 10% in the first direction, and 2% to 10% in the second direction which is orthogonal to the first direction. Thermal shrinkage of the separator is more preferably 4% to 9% in the first direction, and 3% to 9% in the second direction, and still more preferably 5% to 8% in the first direction, and 3.5% to 5% in the second direction.

It is a preferable embodiment that the first direction is the MD direction (forward direction when the separator formed in sheet form is wound-up onto a roll, and it is also referred to as "longer side direction"), and the second direction is the TD direction (direction orthogonal to the MD direction, and it is also be referred to as "width direction" or "shorter side direction"), because the production of the separator is easy (hereafter, there may be the case where the first direction is notated as the MD, and the second as the TD). In the present description, "unconstrained state" means a state that a subject is not fixed, and means that the separator, for example, in a sheet-state, is placed into an oven as it is. This thermal shrinkage is measured in accordance with the method described in the following Examples.

Still more, a larger electrode area which is any one of a positive electrode area of the positive electrode active material layer of the positive electrode body and a negative electrode area of the negative electrode active material layer of the negative electrode body, and the separator area have the following relationship:

(separator area)>(electrode area); and $X^1$ and $X^2$ are both 0.5 to 8.0, wherein $X^1$ is calculated by formula (1):

$$X^1 = \{L_1 \text{ or } L_1'/(A/2)\} \times 100$$

wherein, in an arbitrary straight line which is parallel to the first direction of the separator and makes any one of $L_1$ and $L_1'$ the shortest, in a top view, A is a length of a portion where the electrode area in the arbitrary straight line and the separator overlap, and $L_1$ and $L_1'$ are lengths of portions where the electrode area and the separator do not overlap; and wherein $X^2$ is calculated by formula (2):

$$X^2 = \{L_2 \text{ or } L_2'/(B/2)\} \times 100$$

wherein, in an arbitrary straight line which is parallel to the second direction of the separator and makes any one of $L_2$ and $L_2'$ the shortest, in a top view, B is a length of a portion where the electrode area in the arbitrary straight line and the separator overlap, and $L_2$ and $L_2'$ are lengths of portions where the electrode area and the separator do not overlap.

Figure 2:
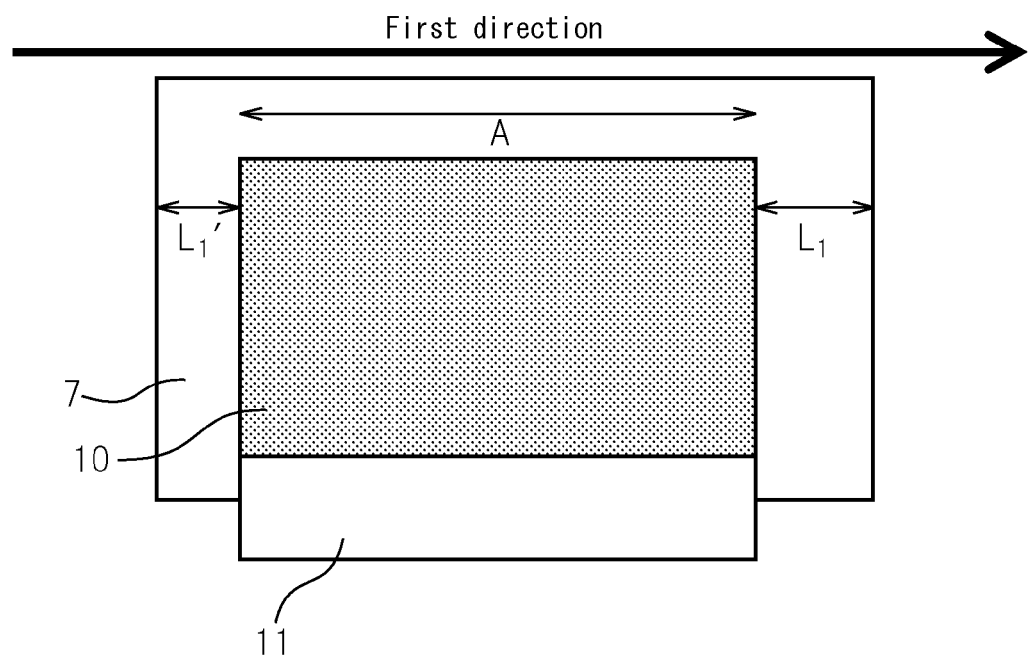
FIG. 2 is a schematic drawing explaining relation between electrode area which is any one of an area of a positive electrode active material layer of a positive electrode body and a negative electrode area of a negative electrode active material layer of a negative electrode body, and separator area.

An explanation will be given on A, $L_1$, and $L_1'$ for determining $X^1$ with reference to FIG. 2. "7" indicates the separator; "10" indicates an electrode having a larger electrode area which is any one of the positive electrode area of the positive electrode active material layer of the positive electrode body and the negative electrode area of the negative electrode active material layer of the negative electrode body; and "11" indicates a current collector (portion where the active material layer is not coated) in the electrode 10. The same indications apply to $X^2$.

$X^1$ and $X^2$ are preferably 2.0 to 6.0, and still more preferably 3.0 to 5.0.

Figure 3:
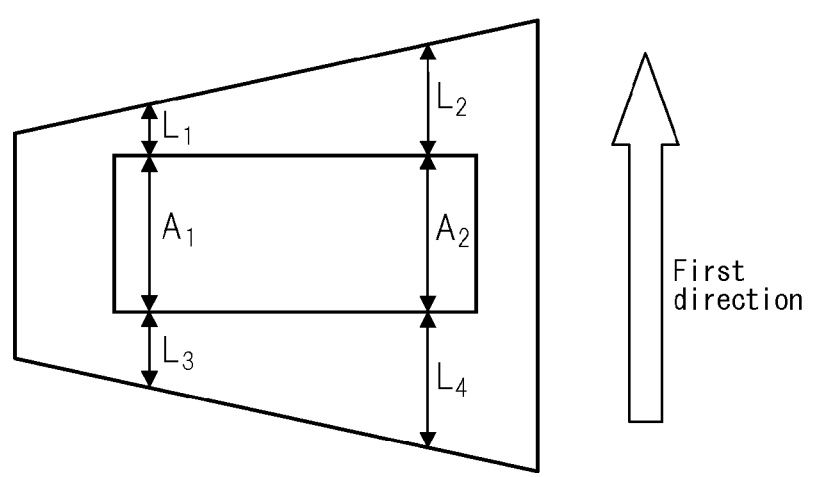
FIG. 3 is a schematic drawing explaining the concept of margin.

An explanation will be given on concept of the term "margin" in the present invention, with reference to FIG. 3.

(1) Points to be Noticed

The margin is defined by a ratio of separator width ($L_1$, $L_2$, $L_3$, $L_4$) protruding from the electrode to electrode width ($A_1$, $A_2$).

The margin portion ($L_1$) having the shortest width shrinks to the inside of the electrode fastest by heating, resulting in short circuit ($L_1 < L_3 < L_2 < L_4$). Accordingly, the margin portion ($L_1$) having the shortest width was adopted as a specification method, in response to various shapes.

(1) Specification Method

Firstly, the direction of the separator is specified. The separator has the MD direction and the TD direction derived from a production method, and the directions for a commercial product can be specified also from a thermally shrunk state by dismounting and heating. Accordingly, it is specified by the MD direction and the TD direction. Here, MD direction=the first direction, and the TD direction=the second direction.

Next, the margin was specified. The margin was specified by assuming an arbitrary line parallel to the specified direction, specifying electrode width ($A_1$, $A_2$) and protruded width of the separator ($L_1$, $L_2$, $L_3$, $L_4$), and using the shortest protrusion width $L_1$ of the separator $$\text{Margin} = \{L_1/(A_1/2)\} \times 100 (\%)$$

Using electrode width ($A_1/2$) as standard, ratio of thermal shrinkage of "$A_1$ to $L_1$, $L_3$" and "$A_2$ to $L_2$, $L_4$" was standardized.

In a sealed-type storage element using a laminated film casing, the casing is unsealed by vaporized pressure of the electrolytic solution, when it is exposed for a long period of time in an abnormally high temperature state largely over boiling point of the electrolytic solution. Such a separator, that is capable of making short circuit of the capacitor, is preferable in order to prevent the capacitor from rupturing and igniting, and thereby enhancing safety, before unsealing the casing by vaporized pressure of the electrolytic solution inside the capacitor, caused by duration of an abnormally high temperature state. In this case, "rupturing" means a state that the electrode laminate falls apart and mixes with the electrolytic solution and then escapes from the casing when the casing is opened.

It is necessary to shut down the separator of a lithium ion battery at abnormally high temperature, however, it is necessary to avoid short circuit of the positive electrode body and the negative electrode body caused by melt down at a higher temperature, as much as possible. Accordingly, the separator having low thermal shrinkage and being difficult to melt down has been used. On the other hand, in the separator of the lithium ion capacitor, because it is not necessary to make it shut down at an abnormally high temperature, a paper separator, which never shuts down and melts even at a higher temperature, has been used. However, the present inventor has discovered that even in the lithium ion capacitor, there is a risk of rupturing/igniting, when higher capacitance and higher output are pursued, and such function that provides nearly simultaneous melt down, in shut down at an abnormally high temperature, is effective to prevent this. It has been found that the separator having such thermal shrinkage as described above and comprising of a polyolefin resin including polyethylene is preferable, because it is capable of melting down in a short period of time at an abnormally high temperature, and thus short circuit of the capacitor can occur safely without rupturing or igniting, and thereby safety can be enhanced, in unsealing of the casing due to an abnormally high temperature state.

As described above, when the thermal shrinkage of the separator of the present invention is 3% or larger in the first direction, and 2% or larger in the second direction, melt down can be obtained in a short period of time at an abnormally high temperature, and short circuit of the capacitor can be obtained safely without rupturing or igniting, and thereby safety can be enhanced; as well as when thermal shrinkage is 10% or smaller in the first direction, and 10% or smaller in the second direction, capacitor function can be maintained, without making short circuit in a normal temperature range.

In addition, when $X^1$ and $X^2$ are 0.5 or larger, capacitor function can be maintained without making short circuit in a normal use temperature range, and when they are 8.0 or smaller, melt down can be obtained in a short period of time at an abnormally high temperature, and short circuit of the capacitor can be obtained safely without rupturing or igniting, and thereby safety can be enhanced.

In the present embodiment, it is preferable that the separator is a microporous membrane, and a puncture strength (absolute strength) of the microporous membrane is preferably 200 g or higher, and more preferably 300 g or higher. To make the puncture strength 200 g or higher is preferable, so that generation of a pinhole or a crack can be decreased in the case of using the microporous membrane as the separator for the capacitor, even in the case where a sharp part of the electrode material, etc., provided in the capacitor pierces into the microporous membrane. The upper limit of the puncture strength is not limited, however, it is preferably 1000 g or lower. In addition, the puncture strength is measured in accordance with the method described in the following Examples.

A porosity of the microporous membrane of the present embodiment is preferably 30% to 70%, and more preferably 55% to 70%. It is preferable to set the porosity at 30% or higher, in response to rapid migration of lithium ions at a high rate, in the case where the microporous membrane is used as the separator of the capacitor. On the other hand, it is preferable to set the porosity at 70% or lower, in order to enhance membrane strength, and also in view of suppressing self-discharge, in the case where the microporous membrane is used as the separator of the capacitor.

In addition, the alternate current resistance of the microporous membrane in the present embodiment is preferably 0.9 $\Omega cm^2$ or lower, more preferably 0.6 $\Omega cm^2$ or lower, and still more preferably 0.3 $\Omega cm^2$ or lower, in view of output in the case of using it as the separator of the capacitor.

<3.2. Electrode Terminal and Connection Thereof to Electrode Body>

In the electrode body, one end of the positive electrode terminal is electrically connected to the positive electrode, and one end of the negative electrode terminal is electrically connected to the negative electrode. Specifically, the positive electrode terminal is electrically connected to the non-coated region of the positive electrode active material layer of the positive electrode collector, and the negative electrode terminal is electrically connected to the non-coated region of the negative electrode active material layer of the negative electrode collector. It is preferable that the positive electrode terminal material is aluminum, and the negative electrode terminal material is copper plated with nickel.

The electrode terminal (the positive electrode terminal and the negative electrode terminal are referred to such collectively) generally has a nearly rectangular shape, and one end thereof is electrically connected to the collector of the electrode, and the other end is electrically connected to outer load (in the case of discharging) or a power source (in the case of charging), during use. It is a preferable aspect that, to the center part of the electrode terminal, which is a sealed part of a laminated film casing, a film made of a resin, such as polypropylene, is attached, so as to prevent short circuit of the electrode terminal and the metal foil composing the laminated film, and also to enhance sealing tightness.

The electrical connection method of the electrode body and electrode terminal is usually, for example, an ultrasonic welding method, however, it may be resistance welding, laser welding, etc., and not especially limited.

<3.3. Casing>

A metal can to be used in the casing is preferably made of aluminum. In addition, as the laminated film to be used in the casing, a laminated film of a metal foil and a resin film is preferable, and a three-layer structure comprising an outer layer resin film/a metal foil/an inner layer resin film is exemplified. The outer layer resin film is used to prevent the metal foil from receiving damage caused by contact, etc., and as the outer layer resin film, a resin, such as nylon, a polyester can be used suitably. The metal foil is used to prevent permeation of moisture or gas, and as the metal foil, a foil of copper, aluminum, stainless steel, etc., can be used suitably. In addition, the inner layer resin film is used to protect the metal foil from the electrolytic solution which is stored inside the casing, as well as to carry out melt sealing during heat sealing, and a polyolefin, an acid modified polyolefin can be used suitably.

<3.4. Nonaqueous Electrolytic Solution>

The nonaqueous electrolytic solution for use in the capacitor of the present invention may be a nonaqueous fluid having a lithium ion-containing electrolyte. The nonaqueous fluid may contain a solvent, and as the solvent, there can be used, for example, a cyclic carbonate ester represented by ethylene carbonate (EC) and propylene carbonate (PC); a chained carbonate ester represented by diethyl carbonate (DEC), dimethyl carbonate (DMC), and methyl ethyl carbonate (MEC); a lactone such as γ-butyrolactone (γBL), and mixed solvents thereof.

As an electrolyte dissolved into the nonaqueous liquid, a lithium salt, such as $LiBF_4$, $LiPF_6$ can be used. Concentration of the salt in the electrolytic solution is preferably in a range of 0.5 to 2.0 mol/L. When the concentration is 0.5 mol/L or higher, an anion is sufficiently present and capacitance of the storage element is maintained. On the other hand, when the concentration is 2.0 mol/L or lower, the salt is dissolved sufficiently in the electrolytic solution, and suitable viscosity and conductivity of the electrolytic solution can be maintained.

<3.5. Assembly of Electrical Storage Element>

In the nonaqueous lithium-type storage element of the present embodiment, the positive electrode and the negative electrode are inserted into the casing formed of a metal can or a laminated film, as an electrode body laminated or wind-roundly laminated via the separator.

One embodiment of the nonaqueous lithium-type storage element in the present embodiment is shown by a cross-sectional schematic drawing of FIGS. 1 (*a*) and (*b*), and is an aspect, where a positive electrode terminal (1) and a negative electrode terminal (2) are led from one side of an electrode body (4). As another embodiment, there is included an aspect, where the positive electrode terminal (1) and the negative electrode terminal (2) are led from facing two sides of the electrode body (4). The latter embodiment is suitable for a larger current, because the electrode terminal can be widened.

The storage element is obtained by alternately laminating the positive electrode, where a positive electrode active material layer (6) is laminated on a positive electrode collector (5), and a negative electrode, where a negative electrode active material layer (9) is laminated on a negative electrode collector (8), so that the positive electrode active material layer (6) and the negative electrode active material layer (9) face each other by sandwiching a separator (7) to form the electrode laminate (4); connecting the positive electrode terminal (1) to the positive electrode collector (5); and connecting the negative electrode terminal (2) to the negative electrode collector (8); storing the electrode laminate (4) into a casing (3); injecting a nonaqueous electrolytic solution (not shown) into the casing (3); and sealing a peripheral part of the casing (3) in a state that terminals of the positive electrode terminal (1) and the negative electrode terminal (2) are pulled out outside of the casing (3).

<3.6 Voltage in Using the Electrical Storage Element>

The storage element of the present invention is preferably used between the maximum rating voltage and the minimum rating voltage. The maximum rating voltage is set, for example, within a range of 3.8 to 4.0 V, because the higher the maximum rating voltage is to the extent that overcharge is not carried out, the higher the capacitance is. In addition, the minimum rating voltage is set, for example, within a range of 2.0 to 2.3 V, because the lower the minimum rating voltage is to the extent that overdischarge is not carried out, the higher the capacitance is.

Because the storage element just after the assembly has a voltage of about 3 V by pre-doping lithium ions to the negative electrode, it is preferable to use it after charging, as needed. A pre-doping amount of lithium ions varies within a band of about ±100 mAh/g, depending on doping or undoping due to charge/discharge within a range of 2 to 4 V. Accordingly, in the case where the pre-doping amount of lithium ions per unit weight of the negative electrode active material is within a range of 1100 to 2000 mAh/g, the doping amount of lithium ions in the negative electrode active material after charge/discharge so as to attain a potential of 2 to 4 V, is within a range of 1000 to 2100 mAh/g.

EXAMPLES

Examples and Comparative Examples will be shown below to further clarify characteristics of the present invention, however, the present invention should not be limited to the Examples.

Example 1

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, the BET specific surface area was 1,780 $m^2$/g, the mesopore volume (V1) was 0.198 cc/g, the micropore volume (V2) was 0.695 cc/g, V1/V2=0.29, and the average fine pore size was 21.2 Å.

150 g of the activated carbon was put in a cage made of a stainless steel mesh, the cage was placed in a stainless steel vat containing 75 g of coal-based pitch (softening point: 80° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 680° C. taking 2 hours, and by keeping the activated carbon at the same temperature for 4 hours. The activated carbon was then naturally cooled down to 60° C., and was subsequently taken out from the furnace to obtain a composite porous material "1" as a negative electrode material.

The composite porous material "1" had a weight ratio of deposited carbonaceous material (hereafter it may also be referred to as "pitch coal") to the activated carbon of 20%, a BET specific surface area of 958 $m^2$/g, a mesopore volume (Vm1) of 0.153 cc/g, a micropore volume (Vm2) of 0.381 cc/g. As a result of measurement for average particle size, using a laser diffraction-type particle size distribution measurement apparatus (SALD-2000J), manufactured by Shimadzu Corp., the average particle size was 3.01 μm.

Next, a slurry was obtained by mixing 83.4 parts by weight of the composite porous material "1" obtained as described above, 8.3 parts by weight of acetylene black, and 8.3 parts by weight of PVDF (polyfluorovinilidene), as well as NMP (N-methylpyrrolidone). Next, the obtained slurry was coated onto one surface of a copper foil having a thickness of 15 μm, dried and pressed to obtain a negative electrode having a thickness of the negative electrode active material layer of 30 μm. The thickness of the negative electrode active material layer was obtained by deducting the thickness of the copper foil from the average value of thicknesses of the negative electrode, which were measured at 10 places of the negative electrode, using the film thickness gauge manufactured by Ono Keiki Corp. (Linear Gauge Sensor GS-551).

In a three electrode-type cell, where a working electrode having an area of 3 cm$^2$ was cut out from the negative electrode obtained as described above, and lithium was used as a counter electrode and reference electrode, and an electrolytic solution was obtained by dissolving LiPF$_6$ at a concentration of 1 mol/L, in a mixed solvent of ethylene carbonate and methyl ethyl carbonate in a weight ratio of 1:4; an initial time lithium charging amount is defined by a charging amount, after constant-current and constant-voltage charging is carried out for 40 hours in total by charging lithium at a constant current, and still more charging lithium by means of switching the constant current to a constant voltage when negative electrode potential reaches 1 mV, under a condition that a current value is set to be 100 mA/g per the negative electrode active material, and a cell temperature is 45° C.; and an initial time lithium discharging amount is defined by a discharging amount when discharging lithium till the negative electrode potential reaches to 2.5 V at the constant current under a condition that the current value is reset to be 50 mA/g per the negative electrode active material, and the cell temperature is 45° C., after the above-described charging is carried out; and as a result, the initial time lithium charging amount was 1605 mAh/g, and a discharging amount at a negative electrode potential of 0 to 0.5 V was 145 mAh/g in the initial time lithium discharging amount.

A negative electrode of Example 1 having an area of 3 cm$^2$ was again cut out from the negative electrode, and was pre-doped with lithium ions in a total amount of 1605 mAh/g based on the weight of the composite porous material "1".

(Preparation of Positive Electrode)

Pulverized palm-shell carbonized material was carbonized in a compact carbonization furnace in nitrogen atmosphere at 500° C. The carbonized material after the processing was put inside a furnace, in a heated state of steam in a rate of 1 kg/h, in a preheating furnace, instead of nitrogen, and it was taken out after raising temperature up to 900° C. taking 8 hours, and cooled under nitrogen atmosphere, to obtain an activated carbon. The obtained activated carbon was washed with flowing water for 10 hours, and then drained. After that, it was dried inside an electric drying machine, which was maintained at 115° C., for 10 hours, and then pulverized using a ball mill for 1 hour to obtain an activated carbon as a positive electrode material.

Fine pore distribution of the present activated carbon was measured using a micropore distribution measurement apparatus (AUTOSORB-1 AS-1-MP), manufactured by Yuasa Ionics Co., Ltd. As a result, the BET specific surface area was 2360 m$^2$/g, the mesopore volume (V1) was 0.52 cc/g, the micropore volume (V2) was 0.88 cc/g, V1/V2=0.59 and the average fine pore size was 22.9 Å. A slurry was obtained by using the activated carbon as a positive electrode active material, and by mixing 83.8 parts by weight of the activated carbon, 8.3 parts by weight of acetylene black, and 8.3 parts by weight of PVDF (polyfluorovinilidene), with NMP (N-methylpyrrolidone). Next, the obtained slurry was coated onto one surface of an aluminum foil having a thickness of 15 μm, dried and pressed to obtain a positive electrode having a thickness of 60 μm of the positive electrode active material layer.

(Assembly and Performance Evaluation of Electrical Storage Element)

The nonaqueous lithium-type storage element was assembled by sandwiching a paper separator made of cellulose having a thickness of 30 μm between the positive electrode obtained as described above, which was cut in a size of 3 cm$^2$, and the negative electrode, which was pre-doped with lithium ions, so that the positive electrode and the negative electrode face each other, and by enclosing the positive electrode, the negative electrode and the separator in a casing made of a laminated film using polypropylene and aluminum. In this time, a solution, where LiPF$_6$ was dissolved, so as to attain a concentration of 1 mol/L, into a mixed solvent of ethylene carbonate and methyl ethyl carbonate in 1:4 (weight ratio), was used as an electrolytic solution.

The storage element prepared was charged up to 4.0 V at a current of 1 mA, and then subjected to constant-current and constant-voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.423 mAh. Next, similar charging was carried out, and discharging down to 2.0 V at 250 mA was then carried out, resulting in a capacitance of 0.297 mAh. That is, a ratio of discharge capacitance at 250 mA to discharge capacitance at 1 mA was 70.2%. In addition, discharge capacitance per unit volume of the negative electrode active material layer was 47 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. The capacitance retention rate is a numerical value represented by {(discharge capacitance after 1000 h elapsed)/(discharge capacitance at 0 h)}×100. After 1000 h elapsed, the capacitance retention rate at 1 mA was 90%, and the capacitance retention rate at 150 mA was 69%.

Example 2

(Preparation of Negative Electrode)

A slurry was obtained by mixing 83.4 parts by weight of the composite porous material "1" obtained in Example 1, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 μm, dried and pressed to obtain a negative electrode having the thickness of the negative active material layer of 35 μm.

The negative electrode obtained as described above was pre-doped with lithium ions in a total amount of 1310 mAh/g based on the weight of the composite porous material "1", in a similar step as in Example 1, to prepare a negative electrode of Example 2.

(Preparation of Positive Electrode)

It was prepared similarly as in Example 1.

(Assembly and Performance Evaluation of Electrical storage element)

The storage element was prepared similarly as in Example 1.

The storage element prepared was charged up to 4.0 V at a current of 1 mA, and then subjected to constant-current and constant-voltage charging for 2 hours, where a constant voltage of 4.0 V was applied, using a charge/discharge apparatus (ACD-01), manufactured by Aska Electronic Co., Ltd. Subsequently, the element was discharged down to 2.0

V at a current of 1 mA. Discharge capacitance was 0.414 mAh. Next, similar charging was carried out, and discharging down to 2.0 V was then carried out at 250 mA, resulting in a capacitance of 0.294 mAh. That is, a ratio of discharge capacitance at 250 mA to discharge capacitance at 1 mA was 71.0%. In addition, discharge capacitance per unit volume of the negative electrode active material layer was 39 mAh/cm$^3$.

A cycle test was further carried out, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 68%.

Example 3

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, the BET specific surface area was 1,780 m$^2$/g, the mesopore volume (V1) was 0.198 cc/g, the micropore volume (V2) was 0.695 cc/g, V1/V2=0.29, and the average fine pore size was 21.2 Å. 150 g of the activated carbon was put in a cage made of a stainless steel mesh, the cage was placed in a stainless steel vat containing 150 g of coal-based pitch (softening point: 80° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 680° C. taking 2 hours, and by keeping the activated carbon at the same temperature for 4 hours, and subsequently the activated carbon was cooled down to 60° C. by natural cooling and then it was taken out from the furnace to obtain a composite porous material "2" as a negative electrode material.

The composite porous material "2" had a weight ratio of deposited carbonaceous material to the activated carbon of 47%, a BET specific surface area of 449 m$^2$/g, the mesopore volume (Vm1) of 0.0820 cc/g, the micropore volume (Vm2) of 0.185 cc/g. As a result of measurement for an average particle size, using a laser diffraction-type particle size distribution measurement apparatus (SALD-2000J), manufactured by Shimadzu Corp., the average particle size was 3.05 μm.

Next, slurry was obtained by mixing 83.4 parts by weight of the composite porous material "2" obtained as described above, 8.3 parts by weight of acetylene black, and 8.3 parts by weight of PVDF (polyfluorovinilidene), as well as NMP (N-methylpyrrolidone). Next, the obtained slurry was coated onto one surface of a copper foil having a thickness of 15 μm, dried and pressed to obtain a negative electrode having the thickness of the negative active material layer of 41 μm.

The negative electrode obtained as described above was evaluated by a similar step as in Example 1, and the initial time lithium charging amount was 1442 mAh/g, and discharging amount at a negative electrode potential of 0 to 0.5 V was 165 mAh/g, in the initial time lithium discharging amount.

A negative electrode of Example 3 having an area of 3 cm$^2$ was again cut out from the negative electrode, and was pre-doped with lithium ions in a total amount of 1125 mAh/g based on the weight of the composite porous material "2".
(Preparation of Positive Electrode)

It was prepared similarly as in Example 1.
(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.439 mAh. Next, similar charging was carried out, and discharging down to 2.0 V was then carried out at 250 mA, resulting in a capacitance of 0.311 mAh. That is, a ratio of discharge capacitance at 250 mA to discharge capacitance at 1 mA was 70.8%. In addition, discharge capacitance per unit volume of the negative electrode active material layer was 33 mAh/cm$^3$.

A cycle test was further carried out, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 91%, and capacitance retention rate at 150 mA was 61%.

Example 4

(Preparation of Negative Electrode)

A slurry was obtained by mixing 83.4 parts by weight of the composite porous material "2" obtained in Example 3, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 μm, dried and pressed to obtain a negative electrode having the thickness of the negative active material layer of 36 μm.

The negative electrode obtained as described above was pre-doped with lithium ions in a total amount of 1276 mAh/g based on the weight of the composite porous material "2", in a similar step as in Example 1, to prepare a negative electrode of Example 4.
(Preparation of Positive Electrode)

It was prepared similarly as in Example 1.
(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.431 mAh. Next, similar charging was carried out, and discharging down to 2.0 V was then carried out at 250 mA, resulting in a capacitance of 0.304 mAh. That is, a ratio of discharge capacitance at 250 mA to discharge capacitance at 1 mA was 70.5%. In addition, discharge capacitance per unit volume of the negative electrode active material layer was 40 mAh/cm$^3$.

A cycle test was further carried out, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 91%, and capacitance retention rate at 150 mA was 64%.

Example 5

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, BET specific surface area was 1,780 m$^2$/g, the mesopore volume (V1) was 0.198 cc/g, the micropore volume (V2) was 0.695 cc/g, V1/V2=0.29, and average fine pore size was 21.2 Å. 150 g of the activated carbon was put in a cage made of a stainless steel mesh, the cage was placed in a stainless steel vat containing 150 g of coal-based pitch (softening point: 38° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 680° C. taking 2 hours, and by keeping the activated carbon at the same temperature for 4 hours, and subsequently the activated carbon was cooled down to 60° C. by natural cooling and then it was taken out from the furnace to obtain a composite porous material "3" as a negative electrode material.

The composite porous material "3" had a weight ratio of deposited carbonaceous material to the activated carbon, of 46%, a BET specific surface area of 446 m$^2$/g, the mesopore volume (Vm1) of 0.111 cc/g, the micropore volume (Vm2) of 0.178 cc/g. As a result of measurement for an average particle size, using a laser diffraction-type particle size distribution measurement apparatus (SALD-2000J), manufactured by Shimadzu Corp., the average particle size was 3.17 μm.

Next, a slurry was obtained by mixing 83.4 parts by weight of the composite porous material "3" obtained as described above, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 μm, dried and pressed to obtain a negative electrode having a thickness of the negative active material layer of 41 μm.

The negative electrode obtained as described above was evaluated by a similar step as in Example 1, and the initial time lithium charging amount was 1527 mAh/g, and discharging amount at a negative electrode potential of 0 to 0.5 V was 160 mAh/g, in the initial time lithium discharging amount.

A negative electrode of Example 5 having an area of 3 cm$^2$ was again cut out from the negative electrode, and was pre-doped with lithium ions in a total amount of 1113 mAh/g based on the weight of the composite porous material "3".

(Preparation of Positive Electrode)

It was prepared similarly as in Example 1.

(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.444 mAh. Next, similar charging was carried out, and discharging down to 2.0 V was then carried out at 250 mA, resulting in a capacitance of 0.317 mAh. That is, a ratio of discharge capacitance at 250 mA to discharge capacitance at 1 mA was 71.4%. In addition, discharge capacitance per unit volume of the negative electrode active material layer was 36 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 90%, and capacitance retention rate at 150 mA was 62%.

Example 6

(Preparation of Negative Electrode)

Slurry was obtained by mixing 83.4 parts by weight of the composite porous material "3" obtained in Example 5, 8.3 parts by weight of acetylene black, and 8.3 parts by weight of PVDF (polyfluorovinilidene), as well as NMP (N-methylpyrrolidone). Next, the obtained slurry was coated onto one surface of a copper foil having a thickness of 15 μm, dried and pressed to obtain a negative electrode having a thickness of the negative active material layer of 32 μm.

The negative electrode obtained as described above was pre-doped with lithium ions in a total amount of 1460 mAh/g based on the weight of the composite porous material "3", in a similar step as in Example 1, to prepare a negative electrode of Example 6.

Preparation of Positive Electrode

It was prepared similarly as in Example 1.

(Assembly and Performance Evaluation of Electrical Storage Element)

The storage element was prepared similarly as in Example 1.

The storage element prepared was charged up to 4.0 V at a current of 1 mA, and then subjected to constant-current and constant-voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.415 mAh. Next, similar charging was carried out, and discharging down to 2.0 V was then carried out at 250 mA, resulting in a capacitance of 0.294 mAh. That is, a ratio of discharge capacitance at 250 mA to discharge capacitance at 1 mA was 70.8%. In addition, discharge capacitance per unit volume of the negative electrode active material layer was 43 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 67%.

Example 7

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, BET specific surface area was 1,780 m$^2$/g, the mesopore volume (V1) was 0.198 cc/g, the micropore volume (V2) was 0.695 cc/g, V1/V2=0.29, and average fine pore size was 21.2 Å. 150 g of the activated carbon was put in a cage made of a stainless steel mesh, the cage was placed in a stainless steel vat containing 150 g of coal-based pitch (softening point: 90° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 630° C. taking 2 hours, and by keeping the activated carbon at the same temperature for 4 hours, and subsequently the activated carbon was cooled down to 60° C. by natural cooling and then it was taken out from the furnace to obtain a composite porous material "5" as a negative electrode material.

The composite porous material "5" had a weight ratio of deposited carbonaceous material to the activated carbon of 38%, a BET specific surface area of 434 m$^2$/g, the mesopore volume (Vm1) of 0.220 cc/g, the micropore volume (Vm2) of 0.149 cc/g. As a result of measurement for an average particle size, using a laser diffraction-type particle size distribution measurement apparatus (SALD-2000J), manufactured by Shimadzu Corp., the average particle size was 2.88 μm.

Next, slurry was obtained by mixing 83.4 parts by weight of the composite porous material "5" obtained as described above, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 μm, dried and pressed to obtain a negative electrode having a thickness of the negative active material layer of 32 μm.

The negative electrode obtained as described above was evaluated by a similar step as in Example 1, and the initial time lithium charging amount was 1510 mAh/g, and a discharging amount at a negative electrode potential of 0 to 0.5 V was 165 mAh/g, in the initial time lithium discharging amount.

A negative electrode of Example 7 having an area of 3 cm$^2$ was again cut out from the negative electrode, and was pre-doped with lithium ions in a total amount of 1460 mAh/g based on the weight of the composite porous material "5".

(Preparation of Positive Electrode)

It was prepared similarly as in Example 1.

(Assembly and Performance Evaluation of Electrical Storage Element)

The storage element was prepared similarly as in Example 1.

The storage element prepared was charged up to 4.0 V at a current of 1 mA, and then subjected to constant-current and constant-voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.440 mAh. Next, similar charging was carried out, and discharging down to 2.0 V was then carried out at 250 mA, resulting in a capacitance of 0.315 mAh. That is, a ratio of discharge capacitance at 250 mA to discharge capacitance at 1 mA was 71.5%. In addition, discharge capacitance per unit volume of the negative electrode active material layer was 46 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 68%.

Example 8

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, BET specific surface area was 1,780 m$^2$/g, the mesopore volume (V1) was 0.198 cc/g, the micropore volume (V2) was 0.695 cc/g, V1/V2=0.29, and average fine pore size was 21.2 Å. 150 g of the activated carbon was put in a cage made of a stainless steel mesh, the cage was placed in a stainless steel vat containing 150 g of coal-based pitch (softening point: 50° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 630° C. taking 2 hours, and by keeping the activated carbon at the same temperature for 4 hours, and subsequently the activated carbon was cooled down to 60° C. by natural cooling and then it was taken out from the furnace to obtain a composite porous material "6" as a negative electrode material.

The composite porous material "6" had a weight ratio of deposited carbonaceous material to the activated carbon, of 47%, a BET specific surface area of 376 m$^2$/g, the mesopore volume (Vm1) of 0.177 cc/g, the micropore volume (Vm2) of 0.108 cc/g. As a result of measurement for an average particle size, using a laser diffraction-type particle size distribution measurement apparatus (SALD-2000J), manufactured by Shimadzu Corp., the average particle size was 2.90 μm.

Next, slurry was obtained by mixing 83.4 parts by weight of the composite porous material "6" obtained as described above, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15

μm, dried and pressed to obtain a negative electrode having a thickness of the negative active material layer of 32 μm.

The negative electrode obtained as described above was evaluated by a similar step as in Example 1, and the initial time lithium charging amount was 1545 mAh/g, and a discharging amount at a negative electrode potential of 0 to 0.5 V was 170 mAh/g, in the initial time lithium discharging amount.

A negative electrode of Example 7 having an area of 3 cm² was again cut out from the negative electrode, and was pre-doped with lithium ions in a total amount of 1460 mAh/g based on the weight of the composite porous material "6".
(Preparation of Positive Electrode)

It was prepared similarly as in Example 1.
(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.441 mAh. Next, similar charging was carried out, and discharging down to 2.0 V was then carried out at 250 mA, resulting in a capacitance of 0.314 mAh. That is, a ratio of discharge capacitance at 250 mA to discharge capacitance at 1 mA was 71.2%. In addition, discharge capacitance per unit volume of the negative electrode active material layer was 46 mAh/cm³.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 91%, and capacitance retention rate at 150 mA was 67%.

Comparative Example 1

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, BET specific surface area was 1,780 m²/g, the mesopore volume (V1) was 0.198 cc/g, the micropore volume (V2) was 0.695 cc/g, V1/V2=0.29, and average fine pore size was 21.2 Å. 150 g of the activated carbon was put in a cage made of a stainless steel mesh, the cage was placed in a stainless steel vat containing 270 g of coal-based pitch (softening point: 50° C.), and the cage and vat were then placed inside an electric furnace (effective dimension inside the furnace: 300 mm×300 mm×300 mm), to carry out a thermal reaction. Heat treatment was carried out under nitrogen atmosphere, and by raising temperature up to 600° C. taking 8 hours, and by keeping the activated carbon at the same temperature for 4 hours, and subsequently the activated carbon was cooled down to 60° C. by natural cooling and then it was taken out from the furnace to obtain a composite porous material "4" as a negative electrode material.

The composite porous material "4" had a weight ratio of deposited carbonaceous material to the activated carbon, of 73%, a BET specific surface area of 262 m²/g, the mesopore volume (Vm1) of 0.180 cc/g, the micropore volume (Vm2) of 0.0843 cc/g. As a result of measurement for an average particle size, using a laser diffraction-type particle size distribution measurement apparatus (SALD-2000J), manufactured by Shimadzu Corp., the average particle size was 2.88 μm.

Next, a slurry was obtained by mixing 83.4 parts by weight of the composite porous material "4" obtained as described above, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 μm, dried and pressed to obtain a negative electrode having a thickness of the negative active material layer of 30 μm.

The negative electrode obtained as described above was evaluated by a similar step as in Example 1, and the initial time lithium charging amount was 1080 mAh/g, and discharging amount at a negative electrode potential of 0 to 0.5 V was 165 mAh/g, in the initial time lithium discharging amount.

A negative electrode of Comparative Example 1 having an area of 3 cm² was again cut out from the negative electrode, and was pre-doped with lithium ions in a total amount of 1050 mAh/g based on the weight of the composite porous material "4".
(Preparation of Positive Electrode)

It was prepared similarly as in Example 1.
(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.430 mAh. Next, similar charging was carried out, and discharging down to 2.0 V was then carried out at 250 mA, resulting in a capacitance of 0.287 mAh. That is, a ratio of discharge capacitance at 250 mA, to discharge capacitance at 1 mA was 66.7%. In addition, discharge capacitance per unit volume of the negative electrode active material layer was 48 mAh/cm³.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 52%.

Comparative Example 2

(Preparation of Negative Electrode)

Fine pore distribution of a commercial palm-shell activated carbon was measured using nitrogen as an adsorbent, and using a micropore distribution measurement apparatus (AUTOSORB-1 AS-1-MP), manufactured by Yuasa Ionics Co., Ltd. Specific surface area was determined by a BET one point method. In addition, as described above, using the desorption isotherm, the mesopore volume and the micropore volume were determined by the BJH method and the MP method, respectively. As a result, BET specific surface area was 1,780 m$^2$/g, the mesopore volume (V1) was 0.198 cc/g, the micropore volume (V2) was 0.695 cc/g, V1/V2=0.29, and average fine pore size was 21.2 Å. 150 g of the activated carbon was put in a cage made of a stainless steel mesh, the cage was placed in a stainless steel vat containing 65 g of coal-based pitch (softening point: 135° C.), and the cage and vat were then installed inside an electric furnace (effective dimension inside the furnace: 300 mm×300 mm×300 mm), to carry out a thermal reaction. Heat treatment was carried out under nitrogen atmosphere, and by raising temperature up to 600° C. taking 8 hours, and by keeping the activated carbon at the same temperature for 4 hours, and subsequently the activated carbon was cooled down to 60° C. by natural cooling and then it was taken out from the furnace to obtain a composite porous material "7" as a negative electrode material.

The composite porous material "7" had a weight ratio of deposited carbonaceous material to the activated carbon, of 12%, a BET specific surface area of 1260 m$^2$/g, the mesopore volume (Vm1) of 0.165 cc/g, the micropore volume (Vm2) of 0.455 cc/g. As a result of measurement for an average particle size, using a laser diffraction-type particle size distribution measurement apparatus (SALD-2000J), manufactured by Shimadzu Corp., the average particle size was 3.10 µm.

Next, a slurry was obtained by mixing 83.4 parts by weight of the composite porous material "7" obtained as described above, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 µm, dried and pressed to obtain a negative electrode having a thickness of the negative active material layer of 40 µm.

The negative electrode obtained as described above was evaluated by a similar step as in Example 1, and the initial time lithium charging amount was 2145 mAh/g, and discharging amount, under a negative electrode potential of 0 to 0.5 V, was 90 mAh/g, in the initial time lithium discharging amount.

A negative electrode of Comparative Example 2 having an area of 3 cm$^2$ was again cut out from the negative electrode, and was pre-doped with lithium ions in a total amount of 1610 mAh/g based on the weight of the composite porous material "7".

(Preparation of Positive Electrode)

It was prepared similarly as in Example 1.

(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.425 mAh. Next, similar charging was carried out, and discharging down to 2.0 V was then carried out at 250 mA, resulting in a capacitance of 0.195 mAh. That is, a ratio of discharge capacitance at 250 mA to discharge capacitance at 1 mA was 45.9%. In addition, discharge capacitance per unit volume of the negative electrode active material layer was 35 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 91%, and capacitance retention rate at 150 mA was 30%.

Comparative Example 3

(Preparation of Negative Electrode)

A slurry was obtained by mixing 83.4 parts by weight of the composite porous material "4" obtained in Comparative Example 1, 8.3 parts by weight of acetylene black, and 8.3 parts by weight of PVDF (polyfluorovinilidene), with NMP (N-methylpyrrolidone). Next, the obtained slurry was coated onto one surface of a copper foil having a thickness of 15 µm, dried and pressed to obtain a negative electrode having a thickness of the negative active material layer of 60 µm.

The negative electrode obtained as described above was pre-doped with lithium ions in a total amount of 800 mAh/g based on the weight of the composite porous material "1", by a similar step as in Example 1, to prepare a negative electrode of Comparative Example 3.

(Preparation of Positive Electrode)

It was prepared similarly as in Example 1.

(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.425 mAh. Next, similar charging was carried out, and discharging down to 2.0 V was then carried out at 250 mA, resulting in a capacitance of 0.298 mAh. That is, a ratio of discharge capacitance at 250 mA to discharge capacitance at 1 mA was 70.1%. In addition, discharge capacitance per unit volume of the negative electrode active material layer was 24 mAh/cm$^3$.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 91%, and capacitance retention rate at 150 mA was 63%.

The above results are shown together in following Table 1. From Table 1, it is understood that the negative electrode active material and the negative electrode of the present invention are capable of exerting high energy density and high durability while maintaining output characteristics.

TABLE 1

| | | Negative electrode active material | | | | | Negative electrode | | |
|---|---|---|---|---|---|---|---|---|---|
| | Material | Pitch softening point (° C.) | Pitch coal/activated carbon [weight ratio (%)] | Specific surface area (m²/g) | Initial time Li charging amount (mAh/g) | Initial time Li discharging amount (mAh/g), at Negative electrode potential of 0 to 0.5 V | Active material layer membrane thickness (μm) | Li doping amount (mAh/g) | Active material layer volume (×10⁻³ cm³) |
| Example 1 | Composite porous material 1 | 80 | 20 | 958 | 1650 | 145 | 30 | 1605 | 9.0 |
| Example 2 | | | | | | | 35 | 1310 | 10.5 |
| Example 3 | Composite porous material 2 | 80 | 47 | 449 | 1442 | 165 | 41 | 1125 | 12.3 |
| Example 4 | | | | | | | 36 | 1276 | 10.8 |
| Example 5 | Composite porous material 3 | 38 | 46 | 446 | 1527 | 160 | 41 | 1113 | 12.3 |
| Example 6 | | | | | | | 32 | 1460 | 9.6 |
| Example 7 | Composite porous material 5 | 90 | 38 | 434 | 1510 | 165 | 32 | 1460 | 9.6 |
| Example 8 | Composite porous material 6 | 50 | 47 | 376 | 1545 | 170 | 32 | 1460 | 9.6 |
| Comparative Example 1 | Composite porous material 4 | 50 | 73 | 262 | 1080 | 165 | 30 | 1050 | 9.0 |
| Comparative Example 2 | Composite porous material 7 | 135 | 12 | 1260 | 2145 | 90 | 40 | 1610 | 12.0 |
| Comparative Example 3 | Composite porous material 4 | 50 | 73 | 262 | 1080 | 165 | 60 | 800 | 18.0 |

| | Discharge capacitance | | | Cycle durability | | Energy density |
|---|---|---|---|---|---|---|
| | 1 mA (mAh) | 250 mA (mAh) | Rate (%) | Capacitance retention rate at 1 mA (%) | Capacitance retention rate at 150 mA (%) | mAh/negative electrode volume (cm³) |
| Example 1 | 0.423 | 0.297 | 70.2 | 90 | 69 | 47 |
| Example 2 | 0.414 | 0.294 | 71.0 | 92 | 68 | 39 |
| Example 3 | 0.439 | 0.311 | 70.8 | 91 | 61 | 33 |
| Example 4 | 0.431 | 0.304 | 70.5 | 91 | 64 | 40 |
| Example 5 | 0.444 | 0.317 | 71.4 | 90 | 62 | 36 |
| Example 6 | 0.415 | 0.294 | 70.8 | 92 | 67 | 43 |
| Example 7 | 0.440 | 0.315 | 71.5 | 92 | 68 | 46 |
| Example 8 | 0.441 | 0.314 | 71.2 | 91 | 67 | 46 |
| Comparative Example 1 | 0.430 | 0.287 | 66.7 | 92 | 52 | 48 |
| Comparative Example 2 | 0.425 | 0.195 | 45.9 | 91 | 30 | 35 |
| Comparative Example 3 | 0.425 | 0.298 | 70.1 | 91 | 63 | 24 |

Example 9

(Preparation of Negative Electrode)

It was prepared similarly as in Example 7.

(Preparation of Positive Electrode)

A phenolic resin was subjected to carbonization treatment under nitrogen atmosphere at 600° C. for 2 hours in a furnace. After that, the calcined material was pulverized using a ball mill and classified to obtain a carbonized product having an average particle size of 7 μm.

This carbonized product and KOH were mixed in a weight ratio of 1:5, and the mixture was heated in the furnace under nitrogen atmosphere at 800° C. for 1 hour to activate the mixture. After that, it was washed under stirring for 1 hour using diluted hydrochloric acid, the concentration of which was adjusted to 2 mole/L, then washed by boiling with distilled water till pH thereof stabilizes between 5 to 6, and then dried to prepare an activated carbon.

Fine pore distribution of the present activated carbon was measured by the above method, using a micropore distribution measurement apparatus (AUTOSORB-1 AS-1-MP), manufactured by Yuasa Ionics Co., Ltd., and BET specific surface area by a BET one point method. As a result, the mesopore volume V1 was 1.50 cc/g, the micropore volume V2 was 2.28 cc/g, and BET specific surface area was 3627 m²/g.

By using the activated carbon as the positive active material, a slurry-like active material layer was obtained by mixing 83.4 parts by weight of the activated carbon, 8.3 parts by weight of a conductive carbon black (Ketjen black ECP600JD, manufactured by Lion Corporation) and 8.3 parts by weight of PVDF (polyvinylidene fluoride, KF polymer, W#: 9300, manufactured by Kureha Corporation; melting point: 163° C.) with NMP (N-methylpyrrolidone). Next, the obtained active material layer was coated onto one surface of an aluminum foil having a thickness of 15 μm, and dried. A volume density of the electrode active material layer was 0.28 g/cm³. In addition, the volume density of the electrode active material layer was calculated and determined by sufficiently drying an electrode, in a dry room controlled to have a dew point of −60° C. or lower, and determining weight of the electrode excluding the collector, and a thickness of the electrode active material layer excluding thickness of the collector. With respect to measurement of the thickness, DG-4120, manufactured by Ono Sokki Co., Ltd., was used.

The electrode coated with the active material layer was installed in a feed roll position of FIG. 1, and pressurized under conditions of a line pressure of 110 kgf/cm, a distance between rolls of 60 μm at the first time, and 30 μm at the second time, using a heating press roll apparatus (MSC-31, manufactured by Yuri Roll Machine Co., Ltd.) heated at 140° C. to obtain a positive electrode having the volume density of the electrode active material layer of 0.46 g/cm³, and a thickness of the positive electrode active material layer of 67 μm. Press was carried out at a speed of 5 m/min. With respect to a measurement method for temperature of the heating roll, roll surface temperature was detected in a contactless manner, using an infrared radiation thermometer, IT2-60, manufactured by KEYENCE Co., Ltd., and the temperature was adjusted by PID control. In addition, line pressure was calculated from pressure applied on the pressurization roll, and contact length of the upper and the lower rolls.

(Assembly and Performance Evaluation of Electrical Storage Element)

The storage element was prepared similarly as in Example 1.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.680 mAh. Next, similar charging was carried out, and discharging down to 2.0 V was then carried out at 250 mA, resulting in a capacitance of 0.479 mAh. That is, a ratio of discharge capacitance at 250 mA to discharge capacitance at 1 mA was 70.4%. In addition, discharge capacitance per unit volume of the negative electrode active material layer was 71 mAh/cm³.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 68%.

Example 10

(Preparation of Negative Electrode)
It was prepared similarly as in Example 9.
(Preparation of Positive Electrode)
It was prepared similarly as in Example 9.
(Assembly and Performance Evaluation of Electrical Storage Element)
[Preparation of Separator]
As a pure polymer, homo-polymers of polyethylene having My of 250,000 and 700,000 were prepared in a weight ratio of 50:50. By adding 1.0% by mass of pentaerythrityl-tetrakis-[3-(3,5-di-t-butyl-4-hydroxyphenyl)propionate], as an antioxidant, to 99% by mass of the pure polymer, and by dry-blending them using a tumbler-blender, a mixture of the polymer, etc., was obtained. The obtained mixture of the polymer, etc., was supplied into a twin-screw extruder, whose inside was replaced with nitrogen, by a feeder under nitrogen atmosphere. In addition, liquid paraffin, as a plasticizer, was injected into a cylinder of the extruder by a plunger pump. Melt kneading was carried out using the twin-screw extruder, and the feeder and the pump were adjusted so as to attain an amount ratio of liquid paraffin, occupying in the whole extruded mixture, of 68% by mass (i.e., amount ratio of the mixture of the polymer, etc., (PC) is 32% by mass). Melt kneading conditions were: a setting temperature of 200° C., a number of screw rotation of 100 rpm, and a discharge quantity of 12 kg/h.

Subsequently, by extruding and casting the obtained melt kneaded material on a cooling roll which has been controlled to have a surface temperature of 40° C., via a T-die, a gel sheet having a thickness of 1600 μm was obtained.

Next, the obtained gel sheet was introduced to a simultaneous biaxial tenter drawing machine to carry out biaxial drawing and obtain a drawn sheet. Drawing conditions set were: drawing ratios in the MD of 7.0 times, drawing ratios in the TD of 6.1 times, and the set temperature of 121° C.

Next, the drawn sheet was introduced into a methyl ethyl ketone tank, and was appropriately immersed in methyl ethyl ketone, so as to extract/remove fluid paraffin from the drawn sheet, and then methyl ethyl ketone was removed by drying.

Next, the stretched sheet, from which methyl ethyl ketone was removed by drying, was introduced to a TD tenter to carry out heat setting. Heat setting temperature was set at 121° C., TD maximum stretching ratios was set at 2.0 times, and relaxation ratio was set at 0.90 times. The microporous membrane separator obtained in this way was cut out in a size of 100×50 mm, to match to each measurement direction of the MD and the TD. The sample specimen was held in an oven at 100° C. for 1 hour in a non-restrained state, and then each length of the MD and the TD was measured at room temperature. When thermal shrinkage is given by the following formula:

$$[(\text{length before heating}) - (\text{length after heating})] \times 100 / \text{length before heating},$$

thermal shrinkage was 7% in the MD, and 4% in the TD.

The size of the separator was set, so that $X^1$ and $X^2$ are both 6.0.

The storage element was prepared similarly as in Example 9 with respect to other conditions.

The storage element prepared was charged up to 4.0 V at a current of 1 mA, and then subjected to constant current constant voltage charging for 2 hours, where a constant voltage of 4.0 V was applied, using a charge/discharge apparatus (ACD-01), manufactured by Aska Electronic Co., Ltd. Subsequently, it was discharged down to 2.0 V at a current of 1 mA. Discharge capacitance was 0.680 mAh. Next, similar charging was carried out, and discharging down to 2.0 V was then carried out at 250 mA, resulting in a capacitance of 0.580 mAh. That is, a ratio of discharge capacitance at 250 mA relative to discharge capacitance at 1 mA was 85.2%. In addition, discharge capacitance per unit volume of the negative electrode active material layer was 71 mAh/cm³.

A cycle test was carried out still more, as a durability test, by subjecting the storage element prepared to the cycle test to repeat charging-discharging at constant current of 1 mA and 150 mA at 25° C. Capacitance retention rate at test start time (0 hr) and after 1000 h elapsed was measured. After 1000 h elapsed, capacitance retention rate at 1 mA was 92%, and capacitance retention rate at 150 mA was 69%.

INDUSTRIAL APPLICABILITY

The storage element of the present invention can be utilized suitably in a field of a hybrid drive system, where an internal combustion engine or a fuel cell, a motor and the storage element are combined, in an automobile, and still more in an assist application of instantaneous power peak.

REFERENCE SIGNS LIST

1. Positive electrode terminal
2. Negative electrode terminal
3. Casing
4. Electrode body
5. Positive electrode collector
6. Positive electrode active material layer
7. Separator
8. Negative electrode collector
9. Negative electrode active material layer
10. Electrode having larger area which is any one of an area of a positive electrode active material layer of a positive electrode body and an area of a negative electrode active material layer of a negative electrode body
11. Collector in the electrode (10) (a portion not coated with an active material layer)
12. Feed roll
13. Guide
14. Heating press roll
15. Wind-up roll
16. Hydraulic cylinder
17. Positive electrode where a positive electrode active material layer is coated on a positive electrode collector
A. Length of a portion where electrode area and separator are overlapped in an arbitrary straight line which is parallel to a first direction of a separator
$L_1$. Length of a portion where electrode area and separator are not overlapped
$L_1'$. Length of a portion where electrode area and separator are not overlapped

The invention claimed is:

1. A nonaqueous lithium-type storage element comprising:
a casing;
an electrode body; and
a nonaqueous electrolytic solution comprising a lithium salt;
wherein the electrode body and nonaqueous electrolytic solution are stored within the casing, the electrode body comprises:
a negative electrode comprising a negative electrode collector, and a negative electrode active material layer laminated on one surface or both surfaces of the negative electrode collector;
a positive electrode comprising a positive electrode collector, and a positive electrode active material layer laminated on one surface or both surfaces of the positive electrode collector; and
a separator;
the negative electrode active material layer comprises a negative electrode active material,
the negative electrode active material comprises a composite porous material in which a pitch coal is deposited on a surface of an activated carbon,
the negative electrode active material satisfies following i) and ii):
i) a weight ratio of the pitch coal relative to the activated carbon is 10% to 55%, and a softening point of a pitch as a raw material of the pitch coal is 100° C. or lower; and
ii) the negative electrode active material has a BET specific surface area of 350 m$^2$/g to 1500 m$^2$/g, and is doped with lithium ions in an amount of 1100 mAh/g to 2000 mAh/g, and
initial-time lithium charge/discharge characteristics of the negative electrode active material satisfy following 1) and 2):
1) a charging amount is 1100 mAh/g to 2000 mAh/g; and
2) a discharging amount is 100 mAh/g or higher at a negative electrode potential of 0 to 0.5 V.

2. The nonaqueous lithium-type storage element according to claim 1, wherein the negative electrode active material comprises the composite porous material in which the pitch coal is deposited on the surface of the activated carbon, and the composite porous material satisfies at least one of following I) to III):
I) $0.010 \le Vm1 \le 0.300$, and $0.010 \le Vm2 \le 0.200$;
II) $0.010 \le Vm1 \le 0.200$, and $0.200 \le Vm2 \le 0.400$; and
III) $0.010 \le Vm1 \le 0.100$, and $0.400 \le Vm2 \le 0.650$;
provided that Vm1 (cc/g) is a mesopore volume derived from a fine pore having a size of 20 Å to 500 Å, calculated by a BJH method, and Vm2 (cc/g) is a micropore volume derived from a fine pore having a size of smaller than 20 Å, calculated by a MP method.

3. The nonaqueous lithium-type storage element according to claim 1, wherein the positive electrode active material layer comprises the positive electrode active material;
the positive electrode active material comprises an activated carbon having a BET specific surface area of 2600 m$^2$/g to 4500 m$^2$/g, a mesopore volume V1 (cc/g) of $0.8 < V1 \le 2.5$, derived from a fine pore having a size of 20 Å to 500 Å, calculated by the BJH method, a micropore volume V2 (cc/g) of $0.92 < V2 \le 3.0$, derived from a fine pore having a size of smaller than 20 Å, calculated by the MP method, and an average particle size of 1 μm to 30 μm; and
the positive electrode active material layer has a volume density of 0.40 g/cm$^3$ to 0.70 g/cm$^3$.

4. The nonaqueous lithium-type storage element according to claim 3, wherein, when the separator is maintained at 100° C. for 1 hour in a non-restrained state, the separator has a thermal shrinkage of 3% to 10% in a first direction, and a thermal shrinkage of 2% to 10% in a second direction which is orthogonal to the first direction,
a larger electrode area which is any one of an area of the positive electrode active material layer of the positive electrode and a negative electrode area of the negative electrode active material layer of the negative electrode, and an area of the separator have a following relationship:
(separator area)>(electrode area); and
$X^1$ and $X^2$ are both 0.5 to 8.0,
wherein $X^1$ is calculated by formula (1):

$$X^1 = \{L_1 \text{ or } L_1'/(A/2)\} \times 100$$

wherein, in an arbitrary straight line which is parallel to the first direction of the separator and makes any one of $L_1$ and $L_1'$ the shortest, in a top view, A is a length of a portion where the electrode area in the arbitrary straight line and the separator overlap, and $L_1$ and $L_1'$ are lengths of portions where the electrode area and the separator do not overlap; and wherein $X^2$ is calculated by formula (2):

$$X^2 = \{L_2 \text{ or } L_2'/(B/2)\} \times 100$$

wherein, in an arbitrary straight line which is parallel to the second direction of the separator and makes any one of $L_2$ and $L_2'$ the shortest, in a top view, B is a length of a portion where the electrode area in the arbitrary straight line and the separator overlap, and $L_2$ and $L_2'$ are lengths of portions where the electrode area and the separator do not overlap.

5. The nonaqueous lithium-type storage element according to claim 1, wherein the weight ratio of the pitch coal relative to the activated carbon is 10% to 50%.

* * * * *